US010038540B2

(12) United States Patent
Sun et al.

(10) Patent No.: US 10,038,540 B2
(45) Date of Patent: *Jul. 31, 2018

(54) SHORT TRAINING FIELD FOR WIFI

(71) Applicant: Marvell World Trade Ltd., St. Michael (BB)

(72) Inventors: Yakun Sun, Sunnyvale, CA (US); Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 15/335,149

(22) Filed: Oct. 26, 2016

(65) Prior Publication Data

US 2017/0048046 A1 Feb. 16, 2017

Related U.S. Application Data

(63) Continuation of application No. 14/863,208, filed on Sep. 23, 2015.

(Continued)

(51) Int. Cl.
*H04W 72/02* (2009.01)
*H04L 5/00* (2006.01)
(Continued)

(52) U.S. Cl.
CPC ......... *H04L 5/0053* (2013.01); *H04B 7/0452* (2013.01); *H04L 5/0007* (2013.01);
(Continued)

(58) Field of Classification Search
CPC ...... H04W 72/02; H04W 88/08; H04W 76/00
See application file for complete search history.

(56) References Cited

U.S. PATENT DOCUMENTS 8,867,653 B2    10/2014   Zhang et al.
8,891,435 B2 *  11/2014   Zhang ................... H04L 1/004
                                                          370/319

(Continued)

FOREIGN PATENT DOCUMENTS

WO    WO-2012/122119    9/2012

OTHER PUBLICATIONS

IEEE P802.15.4m/D3, May, 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, (May 2013) (2 pages).

(Continued)

*Primary Examiner* — Hassan Phillips
*Assistant Examiner* — Prenell Jones

(57) ABSTRACT

A first training field is generated for a preamble of an orthogonal frequency division multiplex (OFDM) data unit for transmission via a communication channel according to a first communication protocol. The first training field: i) conforms to a second communication protocol, and ii) has a first periodicity. A second training field is generated for the preamble. The second training field: i) conforms to the first communication protocol, and ii) has a second periodicity that corresponds to a selected transmission mode of the communication channel. The first training field is modulated using a first OFDM tone spacing, and the second training field is modulated using a second OFDM tone spacing, where the second tone spacing is narrower than the first tone spacing. The preamble is generated i) to include the second training field after the first training field, and ii) to indicate the selected transmission mode.

22 Claims, 15 Drawing Sheets

Related U.S. Application Data

(60) Provisional application No. 62/218,322, filed on Sep. 14, 2015, provisional application No. 62/141,180, filed on Mar. 31, 2015, provisional application No. 62/115,787, filed on Feb. 13, 2015, provisional application No. 62/054,098, filed on Sep. 23, 2014.

(51) Int. Cl.
*H04W 72/04* (2009.01)
*H04B 7/0452* (2017.01)
*H04L 27/26* (2006.01)
*H04W 84/12* (2009.01)

(52) U.S. Cl.
CPC ........ *H04L 5/0037* (2013.01); *H04L 27/2605* (2013.01); *H04L 27/2613* (2013.01); *H04L 27/2627* (2013.01); *H04W 72/04* (2013.01); *H04W 84/12* (2013.01)

(56) References Cited

U.S. PATENT DOCUMENTS

| | | | |
|---|---|---|---|
| 8,948,283 | B2 | 2/2015 | Zhang |
| 9,088,504 | B2* | 7/2015 | Yang ................ H04L 41/16 |
| 9,131,528 | B2 | 9/2015 | Zhang et al. |
| 2009/0196163 | A1 | 8/2009 | Du |
| 2012/0201316 | A1 | 8/2012 | Zhang et al. |
| 2012/0320889 | A1* | 12/2012 | Zhang ................ H04L 1/004 |
| | | | 370/338 |
| 2013/0177090 | A1* | 7/2013 | Yang ................ H04L 41/16 |
| | | | 375/260 |
| 2016/0087766 | A1 | 3/2016 | Sun et al. |

OTHER PUBLICATIONS

IEEE Std 802.11ac/D7.0 "Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.11ahTM/D1.0 "Draft Standard for Information Technology—Telecommunications and information exchange between systems Local and metropolitan area networks-Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).

IEEE Std 802.11TM 2012 (Revision of IEEE Std 802.Nov. 2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

International Search Report and Written Opinion for PCT/US2015/051765 dated Apr. 15, 2016.

Invitation to pay fees and a partial International Search Report for PCT/US2015/051765 dated Feb. 10, 2016.

Chun et al. "Legacy Support on HEW frame structure," doc: IEEE 11-13/1057r0, *The Institute of Electrical and Electronics Engineers, Inc.*, pp. 1-8 (Sep. 2013).

Park, "Proposed Specification Framework for TGah D9.x", The Institute of Electrical and Electronics Engineers, doc. No. IEEE 802.11-yy/xxxxr0, pp. 1-30 (Jul. 2012).

Park, "Specification Framework for TGah," *The Institute of Electrical and Electronics Engineers*, doc. No. IEEE 802.11-11/1137r13, pp. 1-58 (Jan. 14, 2013).

Seok et al. "HEW PPDU Format for Supporting MIMO-OFDAMA," IEEE 802.11-14/1210r0, Sep. 14, 2014 (16 pages).

Shi et al., "Phase Tracking During VHT-LTF," Doc. No. IEEE 802.11-10/07711-0, *The Institute of Electrical and Electronics Engineers, Inc.*, pp. 1-19 (Jul. 2010).

Vermani et al. "Preamble Format for 1 MHz," *The Institute of Electrical and Electronics Engineers*, doc. No. IEEE 802.11-11/1482r2, pp. 1-30 (Nov. 2011).

Zhang et al., "1 MHz Waveform in Wider BW", *The Institute of Electrical and Electronics Engineers*, doc. No. IEEE 802.11-12/0309r1, pp. 1-10 (Mar. 2012).

International Preliminary Report on Patentability in International Patent Application No. PCT/US2015/051765, dated Apr. 6, 2017 (14 pages).

U.S. Appl. No. 15/883,806, Sun et al., "Short Training Field for WiFi," filed Jan. 30, 2018.

* cited by examiner

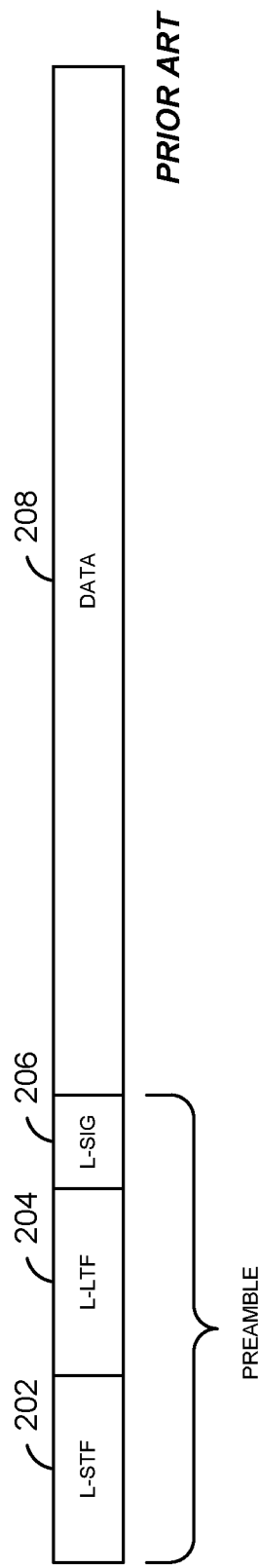
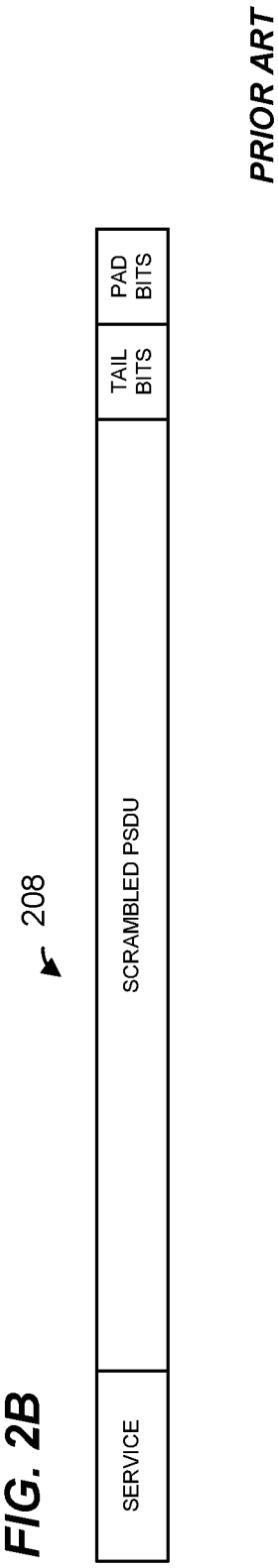
FIG. 2A  *PRIOR ART*
FIG. 2B  *PRIOR ART*

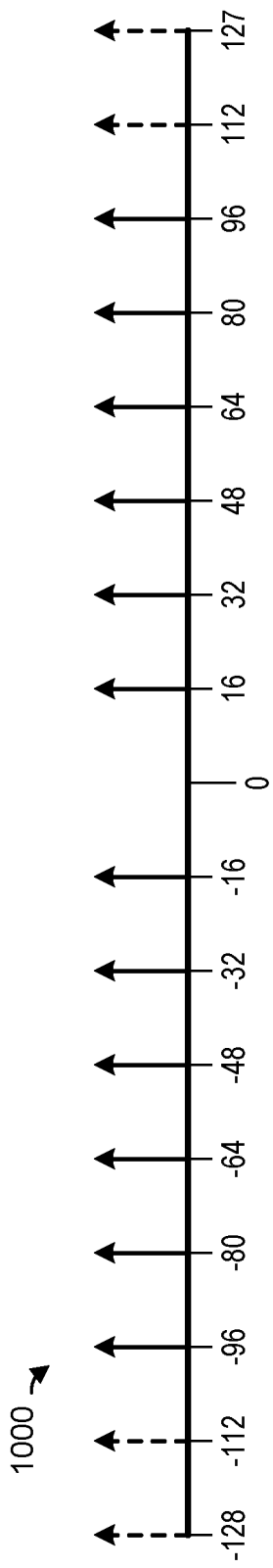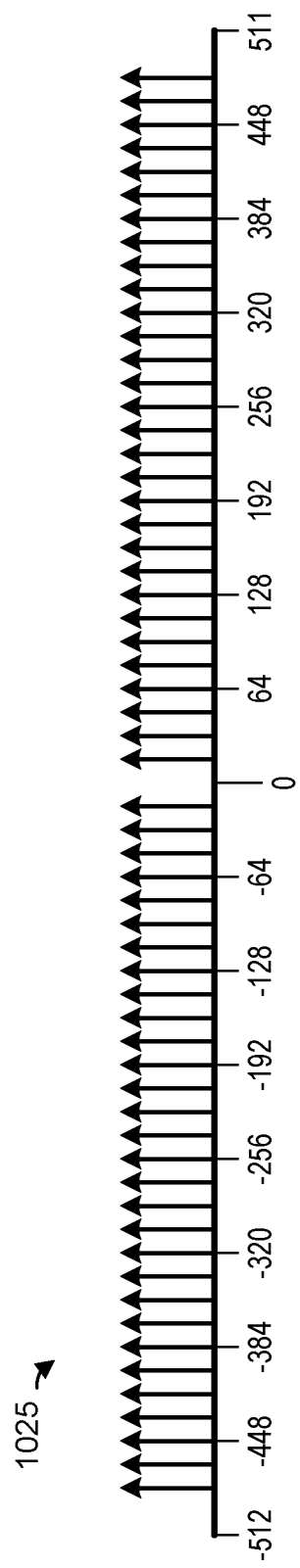

$$r_{HE-STF}^{(i_{Seg},i_{TX})}(t) = \frac{1}{\sqrt{N_{HE-STF}^{Tone} N_{STS,total}(k)}} w_{T_{HE-STF}}(t) \sum_{k=-N_{SR}}^{N_{SR}} \sum_{u=0}^{N_{user}(k)-1} \sum_{m=1}^{N_{STS,u}(k)} \left( \left[ \left[ Q_k^{(i_{Seg})} \right] \right]_{i_{TX},(M_u+m)} \alpha_k \Upsilon_{k,BW} HES_k \cdot \exp\left(j2\pi k \Delta_F \left(t - T_{CS,HE}(M_u+m)\right)\right) \right)$$

FIG. 13A

$$r_{HE-STF,u}^{(i_{Seg},i_{TX})}(t) = \frac{1}{\sqrt{N_{HE-STF}^{Tone} N_{STS,u}(k)}} w_{T_{HE-STF}}(t) \sum_{k=-N_{SR}}^{N_{SR}} \sum_{m=1}^{N_{STS,u}(k)} \left( \left[ \left[ Q_{k,u}^{(i_{Seg})} \right] \right]_{i_{TX},m} \alpha_{k,u} \Upsilon_{k,BW} HES_k \cdot \delta_{k,u} \cdot \exp\left(j2\pi k \Delta_F \left(t - T_{CS,HE,u}(m)\right)\right) \right)$$

FIG. 13B

SHORT TRAINING FIELD FOR WIFI

CROSS-REFERENCES TO RELATED APPLICATIONS

This application is a continuation of U.S. patent application Ser. No. 14/863,208, entitled "Short Training Field for WiFi," filed on Sep. 23, 2015, which claims the benefit of U.S. Provisional Patent Application No. 62/054,098, entitled "Short Training Fields for High Efficiency WiFi," filed on Sep. 23, 2014, U.S. Provisional Patent Application No. 62/115,787, entitled "Short Training Fields for High Efficiency WiFi," filed on Feb. 13, 2015, U.S. Provisional Patent Application No. 62/141,180, entitled "Short Training Fields for High Efficiency WiFi," filed on Mar. 31, 2015, and U.S. Provisional Patent Application No. 62/218,322, entitled "Short Training Fields for High Efficiency WiFi," filed on Sep. 14, 2015. The disclosures of all of the applications referenced above are incorporated herein by reference in their entireties.

FIELD OF THE DISCLOSURE

The present disclosure relates generally to communication networks and, more particularly, to wireless local area networks that utilize a short training field in a physical layer preamble of data units.

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for generating an orthogonal frequency division multiplex (OFDM) data unit that conforms to a first communication protocol for transmission via a communication channel includes generating a first training field to be included in a preamble of the OFDM data unit. The first training field: i) conforms to a second communication protocol, and ii) has an integer number of OFDM symbols $L_N$ having a periodicity $L_P$. The method includes generating a second training field to be included in the preamble after the first training field, wherein the second training field: i) conforms to the first communication protocol, ii) has an integer number of OFDM symbols $H_N$ having a periodicity $H_P$, and iii) is based on a frequency sequence having non-zero values at an interval K, where K is an integer. The method includes modulating the first training field using a first tone spacing $L_{TS}$ between adjacent OFDM tones. The method includes modulating the second training field using a second tone spacing $H_{TS}$, where the first tone spacing $L_{TS}$ is a multiple M of the second tone spacing $H_{TS}$. The method includes generating the preamble to include at least the first training field and the second training field. The method includes generating the OFDM data unit to include at least the preamble. Generating the second training field includes generating the second training field such that the periodicity HP: is i) proportional to the periodicity LP and the interval K, and ii) inversely proportional to the multiple M.

In another embodiment, a communication device that generates an orthogonal frequency division multiplex (OFDM) data unit conforming to a first communication protocol for transmission via a communication channel includes a network interface device having one or more integrated circuits. The one or more integrated circuits are configured to generate a first training field to be included in a preamble of the OFDM data unit. The first training field: i) conforms to a second communication protocol, and ii) has an integer number of OFDM symbols $L_N$ having a periodicity $L_P$. The one or more integrated circuits are configured to generate a second training field to be included in the preamble after the first training field. The second training field: i) conforms to the first communication protocol, ii) has an integer number of OFDM symbols $H_N$ having a periodicity $H_P$, and iii) is based on a frequency sequence having non-zero values at an interval K, where K is an integer. The one or more integrated circuits are configured to modulate the first training field using a first tone spacing $L_{TS}$ between adjacent OFDM tones. The one or more integrated circuits are configured to modulate the second training field using a second tone spacing $H_{TS}$, where the first tone spacing $L_{TS}$ is a multiple M of the second tone spacing $H_{TS}$. The one or more integrated circuits are configured to generate the preamble to include at least the first training field and the second training field. The one or more integrated circuits are configured to generate the OFDM data unit to include at least the preamble. The one or more integrated circuits are configured to generate the periodicity $H_P$ to be: i) proportional to the periodicity $L_P$ and the interval K, and ii) inversely proportional to the multiple M.

In another embodiment, a method for generating an orthogonal frequency division multiplex (OFDM) data unit conforming to a first communication protocol for transmission via a communication channel includes: generating a first training field to be included in a preamble of the OFDM data unit, wherein the first training field: i) conforms to a second communication protocol, and ii) has a first periodicity; generating a second training field to be included in the preamble after the first training field, wherein the second training field: i) conforms to the first communication protocol, and ii) has a second periodicity that corresponds to a selected transmission mode of the communication channel; modulating the first training field using a first tone spacing between adjacent OFDM tones; modulating the second training field using a second tone spacing, where the second tone spacing is narrower than the first tone spacing; generating the preamble: i) to include at least the first training field and the second training field, and ii) to indicate the selected transmission mode; and generating the OFDM data unit to include at least the preamble.

In an embodiment, a communication device that generates an orthogonal frequency division multiplex (OFDM) data unit conforming to a first communication protocol for transmission via a communication channel includes a network interface device having one or more integrated circuits. The one or more integrated circuits are configured to: generate a first training field to be included in a preamble of the OFDM data unit, wherein the first training field: i) conforms to a second communication protocol, and ii) has a first periodicity, generate a second training field to be included in the preamble after the first training field, wherein the second training field: i) conforms to the first communication protocol, and ii) has a second periodicity that corresponds to a selected transmission mode of the communication channel, modulate the first training field using a first tone spacing between adjacent OFDM tones, modulate the second training field using a second tone spacing, where the second tone spacing is narrower than the first tone spacing, generate the preamble: i) to include at least the first training field and the second training field, and ii) to indicate the selected transmission mode, and generate the OFDM data unit to include at least the preamble.

In another embodiment, a method for generating an orthogonal frequency division multiplex (OFDM) data unit conforming to a first communication protocol for transmission via a communication channel includes: receiving, from an access point, a transmission mode frame that identifies a transmission mode for the OFDM data unit from a plurality of transmission modes; generating a first training field to be included in a preamble of the OFDM data unit, wherein the first training field: i) conforms to a second communication protocol, and ii) has a first periodicity; generating a second training field to be included in the preamble after the first training field, wherein the second training field: i) conforms to the first communication protocol, and ii) has a second periodicity that corresponds to the identified transmission mode; modulating the first training field using a first tone spacing between adjacent OFDM tones; modulating the second training field using a second tone spacing, where the second tone spacing is narrower than the first tone spacing; generating the preamble to include at least the first training field and the second training field; and generating the OFDM data unit to include at least the preamble.

In an embodiment, a method for causing a transmission of an orthogonal frequency division multiplex (OFDM) data unit conforming to a first communication protocol via a communication channel includes: selecting a transmission mode for the OFDM data unit from a plurality of transmission modes, wherein each of the plurality of transmission modes corresponds to a different periodicity and the selected transmission mode corresponds to a selected periodicity; generating a transmission mode frame that identifies the selected transmission mode; and transmitting the transmission mode frame to a client station so that the client station can determine the selected periodicity from the transmission mode frame for application to a non-legacy short training field of the OFDM data unit transmitted by the client station.

BRIEF DESCRIPTION OF THE DRAWINGS

FIGS. 2A and 2B are diagrams of a prior art data unit format.

FIG. 10A is a diagram illustrating an example frequency sequence for a non-legacy short training field having a first periodicity, according to an embodiment.
FIG. 10B is a diagram illustrating another example frequency sequence for a non-legacy short training field having the first periodicity, according to an embodiment.
FIG. 13A is a diagram illustrating a time-domain function for a downlink non-legacy short training field, according to an embodiment.
FIG. 13B is a diagram illustrating a time-domain function for an uplink non-legacy short training field, according to an embodiment.

DETAILED DESCRIPTION

Figure 1:
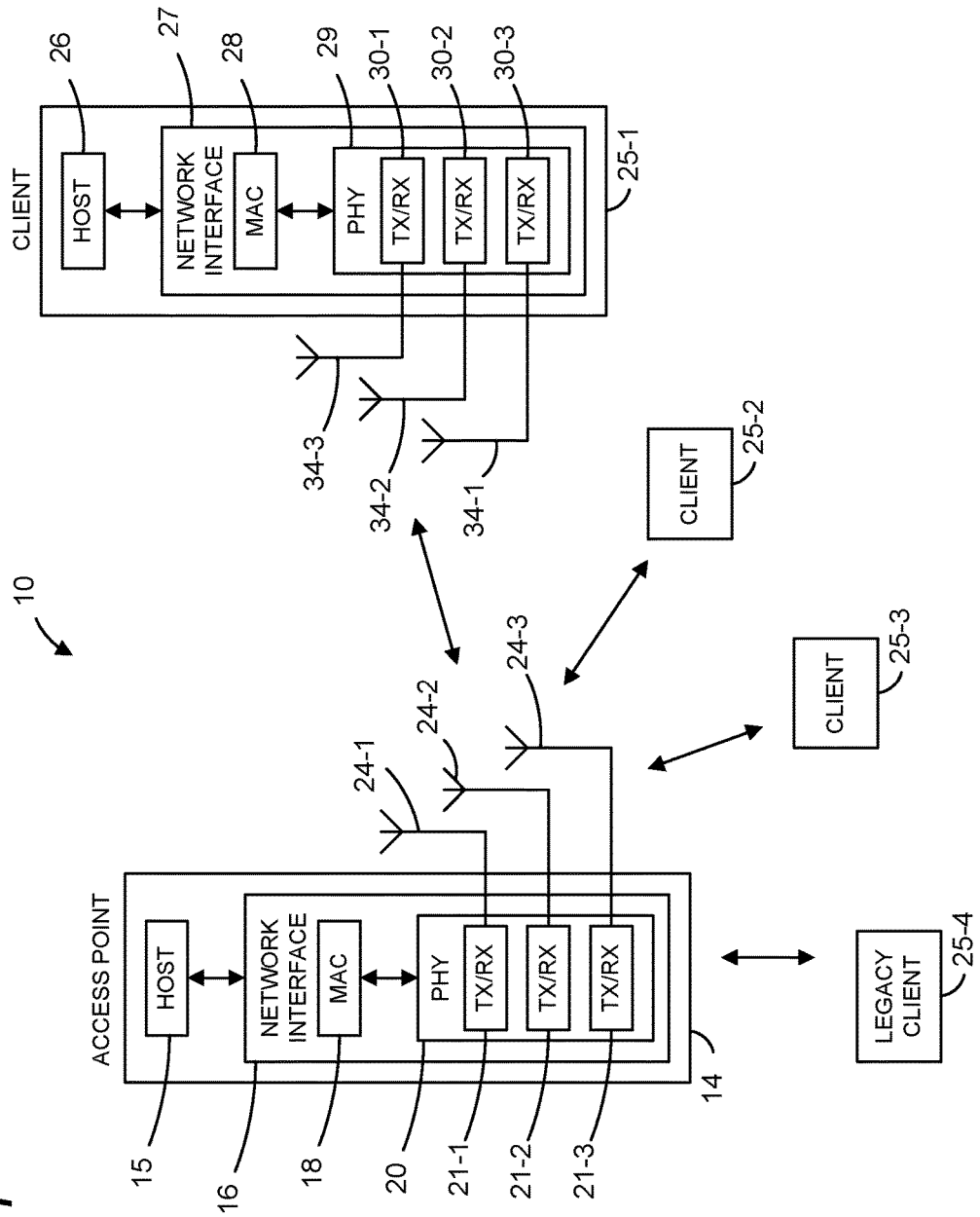
FIG. 1 is a block diagram of an example wireless local area network (WLAN), according to an embodiment.

In embodiments described below, a wireless network device such as an access point (AP) of a wireless local area network (WLAN) transmits data units to one or more client stations. The AP is configured to operate with client stations according to at least a first communication protocol. The first communication protocol is sometimes referred to herein as a "high efficiency Wi-Fi," "HE" communication protocol, or an IEEE 802.11ax communication protocol. In some embodiments, different client stations in the vicinity of the AP are configured to operate according to one or more other communication protocols which define operation in the same frequency band as the HE communication protocol but with generally lower data throughputs. The lower data throughput communication protocols (e.g., IEEE 802.11a, IEEE 802.11n, and/or IEEE 802.11ac) are collectively referred herein as "legacy" communication protocols.

When the AP transmits a data unit over a communication channel according to the HE communication protocol, a preamble of the data unit is formatted such that a client station that operates according to the legacy protocol, and not the HE communication protocol, is able to determine certain information regarding the data unit, such as a duration of the data unit, and/or that the data unit does not conform to the legacy protocol. Additionally, a preamble of the data unit is formatted such that a client station that operates according to the HE protocol is able to determine that the data unit conforms to the HE communication protocol. Similarly, a client station configured to operate according to the HE communication protocol also transmits data units such as described above.

In at least some embodiments, the data unit has a first preamble portion, a second preamble portion, and a data portion. The first preamble portion is modulated using a first tone spacing and the second preamble portion and the data portion are modulated using a second tone spacing. The second tone spacing is smaller, in frequency, than the first tone spacing and provides improved throughput efficiency for at least the data portion of the data unit. A short training field of the second preamble portion is generated with a periodicity based on the second tone spacing. In an embodiment, the HE communication protocol defines a plurality of transmission modes specifying different periodicities for the short training field of the second preamble portion. In at least some embodiments and/or scenarios, the different periodicities provide improved reliability for power estimation or reduced overhead for improved data throughput. A first transmission mode corresponds to a short periodicity for the short training field and is generally used with communication channels characterized by shorter channel delay spreads (e.g., indoor communication channels) and/or generally higher signal to noise ratio (SNR) values, while a second transmission mode corresponds to a relatively longer periodicity for the short training field and is generally used with communication channels characterized by relatively longer channel delay spreads (e.g., outdoor communication channels) and/or generally lower SNR values, in an embodiment. In an embodiment, the access point determines the transmission mode based on a deployment usage (e.g., indoors or outdoors, high or low SNR values, triggered or non-triggered transmission) of the communication channel. In another embodiment, a client station determines the transmission mode based on a trigger frame, a control frame, a management frame, or other suitable frame. In some embodiments, the first preamble portion is configured to provide an indication of the transmission mode used for the short training field of the second preamble portion. In other embodiments, a trigger frame, a control frame, a management frame, or other suitable frame transmitted by the access point is configured to provide the indication of the transmission mode for the short training field of a data unit to be transmitted by a client station.

FIG. 1 is a block diagram of an example wireless local area network (WLAN) 10, according to an embodiment. An AP 14 includes a host processor 15 coupled to a network interface 16. In an embodiment, the network interface 16 includes one or more integrate circuits (ICs) configured to operate as discussed below. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized.

In one embodiment, the MAC processing unit 18 and the PHY processing unit 20 are configured to operate according to a first communication protocol (e.g., the HE communication protocol), including at least a first transmission mode and a second transmission mode of the first communication protocol. In some embodiments, the first transmission mode corresponds to a first periodicity of a short training field. The first transmission mode is configured to reduce signaling overhead as compared to the second transmission mode, which corresponds to a second periodicity that is longer than the first periodicity. In another embodiment, the MAC processing unit 18 and the PHY processing unit 20 are also configured to operate according to a second communication protocol (e.g., according to the IEEE 802.11ac Standard). In yet another embodiment, the MAC processing unit 18 and the PHY processing unit 20 are additionally configured to operate according to the second communication protocol, a third communication protocol, and/or a fourth communication protocol (e.g., according to the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the PHY processing unit 20 of the AP 14 is configured to generate data units conforming to the first communication protocol and having formats described herein. The transceiver(s) 21 is/are configured to transmit the generated data units via the antenna(s) 24. Similarly, the transceiver(s) 21 is/are configured to receive data units via the antenna(s) 24. The PHY processing unit 20 of the AP 14 is configured to process received data units conforming to the first communication protocol and having formats described hereinafter and to determine that such data units conform to the first communication protocol, according to various embodiments.

In various embodiments, the PHY processing unit 29 of the client device 25-1 is configured to generate data units conforming to the first communication protocol and having formats described herein. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol and having formats described hereinafter and to determine that such data units conform to the first communication protocol, according to various embodiments.

FIG. 2A is a diagram of a prior art OFDM data unit 200 that the AP 14 is configured to transmit to the legacy client station 25-4 via orthogonal frequency division multiplexing (OFDM) modulation, according to an embodiment. In an embodiment, the legacy client station 25-4 is also configured to transmit the data unit 200 to the AP 14. The data unit 200 conforms to the IEEE 802.11a Standard and occupies a 20 Megahertz (MHz) bandwidth. The data unit 200 includes a preamble having a legacy short training field (L-STF) 202, generally used for packet detection, initial synchronization, and automatic gain control, etc., and a legacy long training field (L-LTF) 204, generally used for channel estimation and fine synchronization. The data unit 200 also includes a legacy signal field (L-SIG) 206, used to carry certain physical layer (PHY) parameters with the data unit 200, such as modulation type and coding rate used to transmit the data unit, for example. The data unit 200 also includes a data portion 208. FIG. 2B is a diagram of example data portion 208 (not low density parity check encoded), which includes a service field, a scrambled physical layer service data unit (PSDU), tail bits, and padding bits, if needed. The data unit 200 is designed for transmission over one spatial or space-time stream in a single input single output (SISO) channel configuration.

Figure 3:
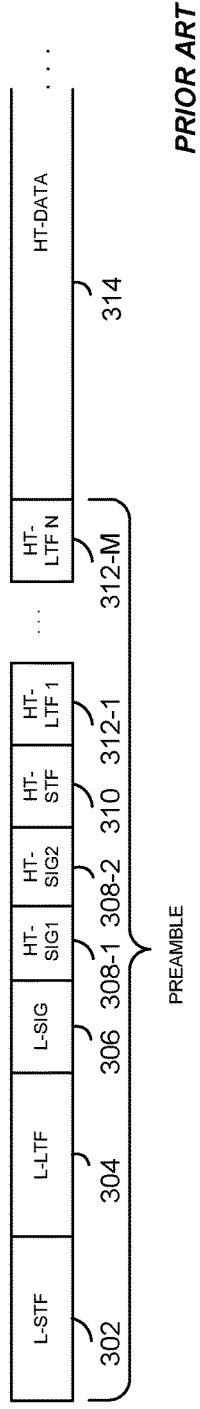
FIG. 3 is a diagram of another prior art data unit format.

FIG. 3 is a diagram of a prior art OFDM data unit 300 that the AP 14 is configured to transmit to the legacy client station 25-4 via OFDM modulation, according to an embodiment. In an embodiment, the legacy client station 25-4 is also configured to transmit the data unit 300 to the AP 14. The data unit 300 conforms to the IEEE 802.11n Standard, occupies a 20 MHz bandwidth, and is designed for mixed mode situations, i.e., when the WLAN includes one or more client stations that conform to the IEEE 802.11a Standard but not the IEEE 802.11n Standard. The data unit 300 includes a preamble having an L-STF 302, an L-LTF 304, an L-SIG 306, a high throughput signal field (HT-SIG) 308, a high throughput short training field (HT-STF) 310, and M data high throughput long training fields (HT-LTFs) 312, where M is an integer generally based on the number of spatial streams used to transmit the data unit 300 in a multiple input multiple output (MIMO) channel configuration. In particular, according to the IEEE 802.11n Standard, the data unit 300 includes two HT-LTFs 312 if the data unit 300 is transmitted using two spatial streams, and four HT-LTFs 312 is the data unit 300 is transmitted using three or four spatial streams. An indication of the particular number of spatial streams being utilized is included in the HT-SIG field 308. The data unit 300 also includes a data portion 314.

Figure 4:
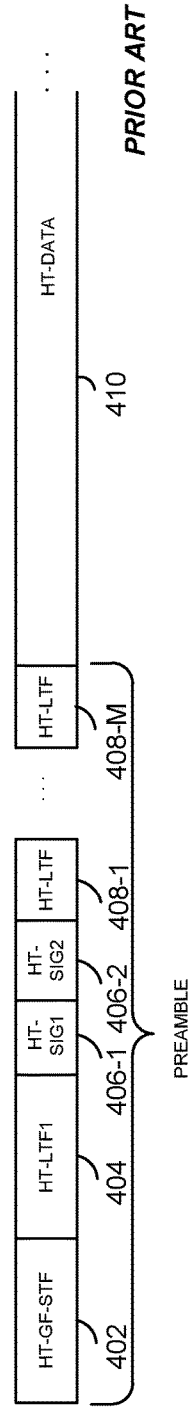
FIG. 4 is a diagram of another prior art data unit format.

FIG. 4 is a diagram of a prior art OFDM data unit 400 that the AP 14 is configured to transmit to the legacy client station 25-4 via OFDM modulation, according to an embodiment. In an embodiment, the legacy client station 25-4 is also configured to transmit the data unit 400 to the AP 14. The data unit 400 conforms to the IEEE 802.11n Standard, occupies a 20 MHz bandwidth, and is designed for "Greenfield" situations, i.e., when the WLAN does not include any client stations that conform to the IEEE 802.11a Standard, and only includes client stations that conform to the IEEE 802.11n Standard. The data unit 400 includes a preamble having a high throughput Greenfield short training field (HT-GF-STF) 402, a first high throughput long training field (HT-LTF1) 404, a HT-SIG 406, and M data HT-LTFs 408. The data unit 400 also includes a data portion 410.

Figure 5:
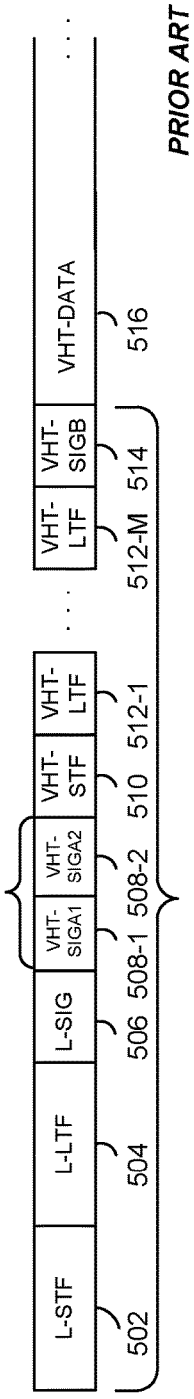
FIG. 5 is a diagram of another prior art data unit format.

FIG. 5 is a diagram of a prior art OFDM data unit 500 that the AP 14 is configured to transmit to the legacy client station 25-4 via OFDM modulation, according to an embodiment. In an embodiment, the legacy client station 25-4 is also configured to transmit the data unit 500 to the AP 14. The data unit 500 conforms to the IEEE 802.11ac Standard and is designed for "Mixed field" situations. The data unit 500 occupies a 20 MHz bandwidth. In other embodiments or scenarios, a data unit similar to the data unit 500 occupies a different suitable bandwidth, such as a 40 MHz, an 80 MHz, or a 160 MHz bandwidth. The data unit 500 includes a preamble having an L-STF 502, an L-LTF 504, an L-SIG 506, two first very high throughput signal fields (VHT-SIGAs) 508 including a first very high throughput signal field (VHT-SIGA1) 508-1 and a second very high throughput signal field (VHT-SIGA2) 508-2, a very high throughput short training field (VHT-STF) 510, M very high throughput long training fields (VHT-LTFs) 512, and a second very high throughput signal field (VHT-SIG-B) 514. The data unit 500 also includes a data portion 516. In an embodiment, the data unit 500 occupies a bandwidth that is an integer multiple of 20 MHz and the L-STF 502 is duplicated within each 20 MHz sub-band. In an embodiment, the VHT-STF 510 has a duration of 4.0 microseconds and uses a same frequency sequence as the L-STF 502. For example, in an embodiment, the VHT-STF 510 uses the frequency sequence defined in equation 22-29 of the IEEE 802.11ac standard. In at least some embodiments, the VHT-STF 510 occupies a whole bandwidth for the data unit 500 (e.g., 20 MHz, 40 MHz, 80 MHz, etc.) and is mapped to multiple antennas for multiple input, multiple output (MIMO) or beamforming in a manner similar to the data portion 516.

Figure 6A:
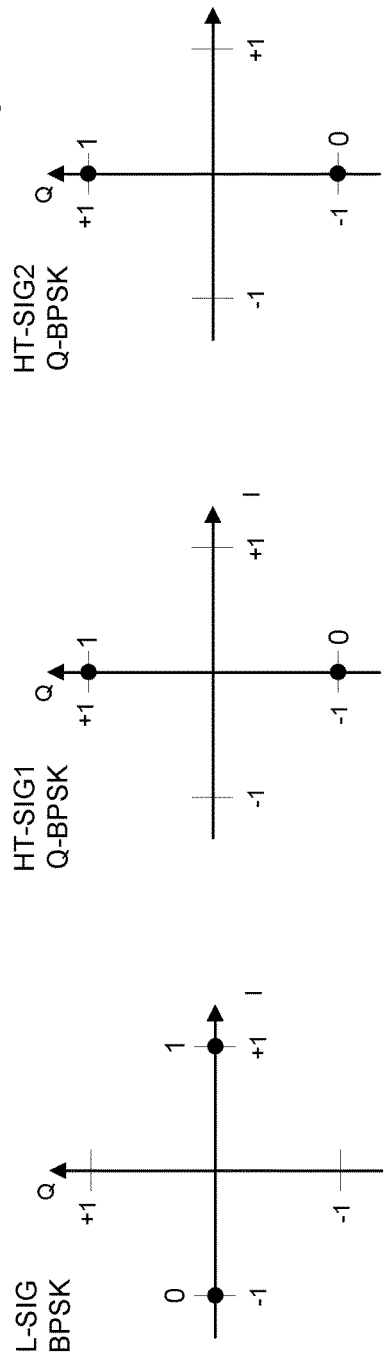
FIG. 6A is a group of diagrams of modulations used to modulate symbols in a prior art data unit.

FIG. 6A is a set of diagrams illustrating modulation of the L-SIG, HT-SIG1, and HT-SIG2 fields of the data unit 300 of FIG. 3, as defined by the IEEE 802.11n Standard. The L-SIG field is modulated according to binary phase shift keying (BPSK), whereas the HT-SIG1 and HT-SIG2 fields are modulated according to BPSK, but on the quadrature axis (Q-BPSK). In other words, the modulation of the HT-SIG1 and HT-SIG2 fields is rotated by 90 degrees as compared to the modulation of the L-SIG field.

Figure 6B:
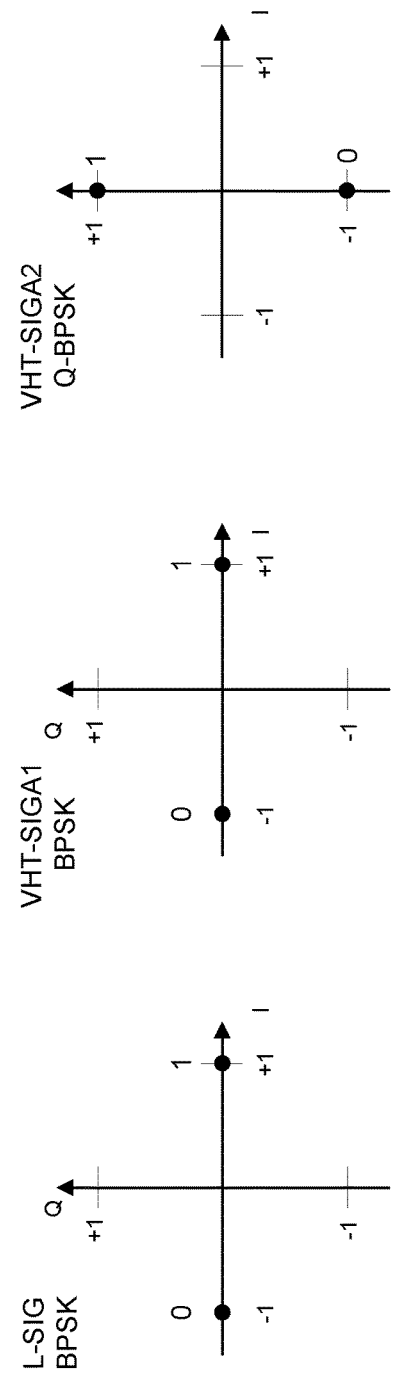
FIG. 6B is a group of diagrams of modulations used to modulate symbols in an example data unit, according to an embodiment.

FIG. 6B is a set of diagrams illustrating modulation of the L-SIG, VHT-SIGA1, and VHT-SIGA2 fields of the data unit 500 of FIG. 5, as defined by the IEEE 802.11ac Standard. Unlike the HT-SIG1 field in FIG. 6A, the VHT-SIGA1 field is modulated according to BPSK, same as the modulation of the L-SIG field. On the other hand, the VHT-SIGA2 field is rotated by 90 degrees as compared to the modulation of the L-SIG field (e.g., is modulated according to Q-BPSK modulation).

Figure 7A:
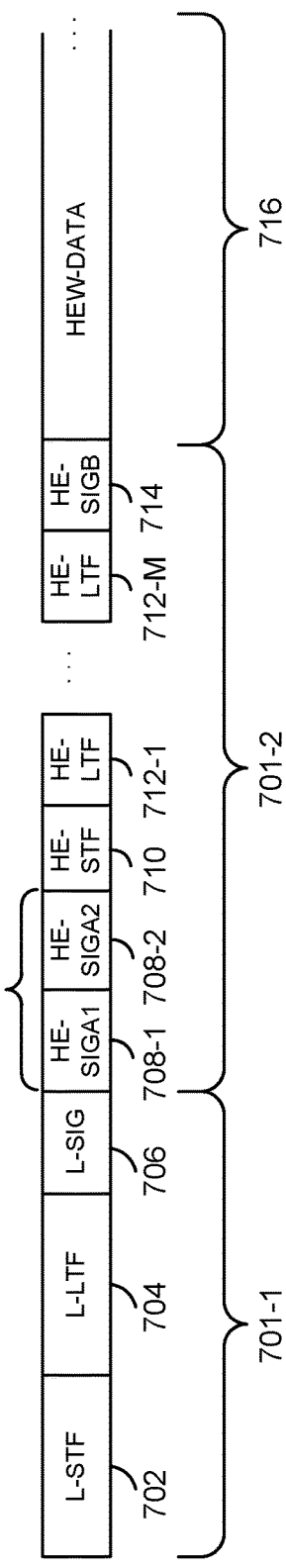
FIG. 7A is a diagram of an orthogonal frequency division multiplexing (OFDM) data unit, according to an embodiment.

FIG. 7A is a diagram of an OFDM data unit 700 that the AP 14 is configured to transmit to the client station 25-1 via orthogonal frequency domain multiplexing (OFDM) modulation, according to an embodiment. In an embodiment, the client station 25-1 is also configured to transmit the data unit 700 to the AP 14. The data unit 700 conforms to the first communication protocol and occupies a 20 MHz bandwidth. Data units that conform to the first communication protocol similar to the data unit 700 may occupy other suitable bandwidths such as 40 MHz, 80 MHz, 160 MHz, 320 MHz, 640 MHz, etc., for example, or other suitable bandwidths, in other embodiments. The data unit 700 is suitable for "mixed mode" situations, i.e., when the WLAN 10 includes a client station (e.g., the legacy client station 25-4) that conforms to a legacy communication protocol, but not the first communication protocol. The data unit 700 is utilized in other situations as well, in some embodiments.

In an embodiment, the data unit 700 includes a preamble 701 having an L-STF 702, an L-LTF 704, an L-SIG 706, two first HE signal fields (HE-SIGAs) 708 including a first HE signal field (HE-SIGA1) 708-1 and a second HE signal field (HE-SIGA2) 708-2, an HE short training field (HE-STF) 710, M HE long training fields (HE-LTFs) 712, and a third HE signal field (HE-SIGB) 714. In an embodiment, the preamble 701 includes a legacy portion 701-1, including the L-STF 702, the L-LTF 704, and the L-SIG 706, and a non-legacy portion 701-1, including the HE-SIGAs 708, HE-STF 710, M HE-LTFs 712, and HE-SIGB 714.

Each of the L-STF 702, the L-LTF 704, the L-SIG 706, the HE-SIGAs 708, the HE-STF 710, the M HE-LTFs 712, and the HE-SIGB 714 are included in an integer number of one or more OFDM symbols. For example, in an embodiment, the HE-SIGAs 708 correspond to two OFDM symbols, where the HE-SIGA1 708-1 field is included in the first OFDM symbol and the HE-SIGA2 is included in the second OFDM symbol. In another embodiment, for example, the preamble 701 includes a third HE signal field (HE-SIGA3, not shown) and the HE-SIGAs 708 correspond to three OFDM symbols, where the HE-SIGA1 708-1 field is included in the first OFDM symbol, the HE-SIGA2 is included in the second OFDM symbol, and the HE-SIGA3 is included in the third OFDM symbol. In at least some examples, the HE-SIGAs 708 are collectively referred to as a single HE signal field (HE-SIGA) 708. In some embodiments, the data unit 700 also includes a data portion 716. In other embodiments, the data unit 700 omits the data portion 716 (e.g., the data unit 700 is a null-data packet).

In the embodiment of FIG. 7A, the data unit 700 includes one of each of the L-STF 702, the L-LTF 704, the L-SIG 706, and the HE-SIGA1s 708. In other embodiments in which an OFDM data unit similar to the data unit 700 occupies a cumulative bandwidth other than 20 MHz, each of the L-STF 702, the L-LTF 704, the L-SIG 706, the HE-SIGA1s 708 is repeated over a corresponding number of 20 MHz-wide sub-bands of the whole bandwidth of the data unit, in an embodiment. For example, in an embodiment, the OFDM data unit occupies an 80 MHz bandwidth and, accordingly, includes four of each of the L-STF 702, the L-LTF 704, the L-SIG 706, and the HE-SIGA1s 708 in four 20 MHz-wide sub-bands that cumulatively span the 80 MHz bandwidth, in an embodiment. In some embodiments, the modulation of different 20 MHz-wide sub-bands signals is rotated by different angles. For example, in one embodiment, a first sub-band is rotated 0-degrees, a second sub-band is rotated 90-degrees, a third sub-band is rotated 180-degrees, and a fourth sub-band is rotated 270-degrees. In other embodiments, different suitable rotations are utilized. The different phases of the 20 MHz-wide sub-band signals result in reduced peak to average power ratio (PAPR) of OFDM symbols in the data unit 700, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIGB and the HE data portion occupy the corresponding whole bandwidth of the data unit.

Figure 7B:
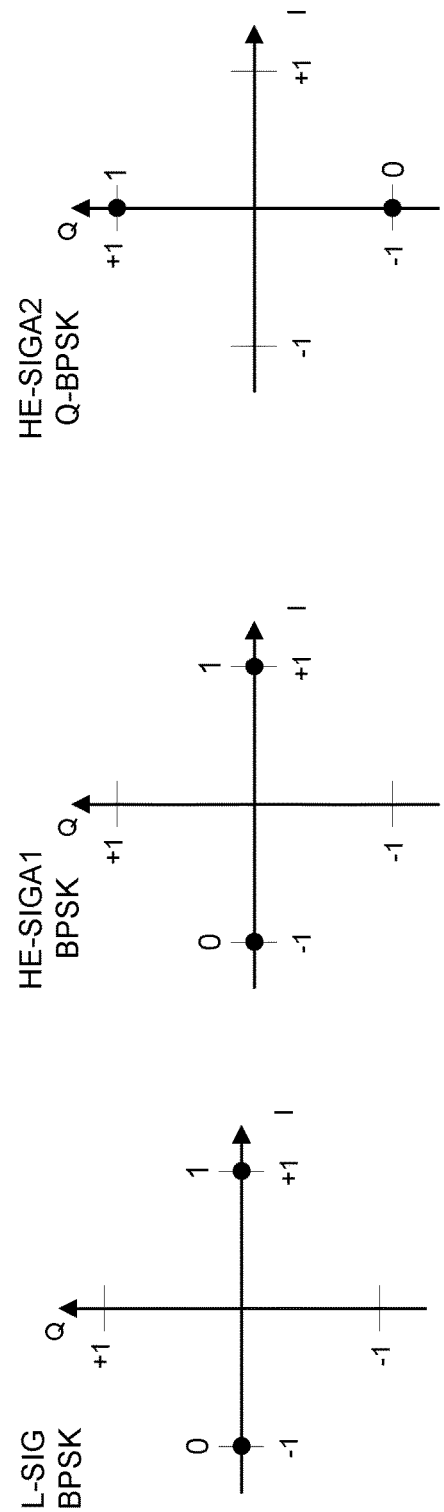
FIG. 7B is a group of diagrams of modulations used to modulate symbols in the data unit depicted in FIG. 7A, according to an embodiment.

FIG. 7B is a set of diagrams illustrating modulation of the L-SIG 706, HE-SIGA1 708-1, and HE-SIGA2 708-2 of the data unit 700 of FIG. 7A, according to an embodiment. In this embodiment, the L-SIG 706, HE-SIGA1 708-1, and HE-SIGA2 708-2 fields have the same modulation as the modulation of the corresponding field as defined in the IEEE 802.11ac Standard and depicted in FIG. 6B. Accordingly, the HE-SIGA1 field 708-1 is modulated using BPSK. On the other hand, the HE-SIGA2 field 708-2 is rotated by 90 degrees as compared to the modulation of the L-SIG field 706. In some embodiments having the third HE-SIGA3 field, the HE-SIGA2 field 708-2 is modulated the same as the L-SIG field 706 and the HE-SIGA1 field 708-1, while the HE-SIGA3 field is rotated by 90 degrees as compared to the modulation of the L-SIG field 706, the HE-SIGA1 field 708-1, and the HE-SIGA2 field 708-2.

In an embodiment, because the modulations of the L-SIG 706, HE-SIGA1 708-1, and HE-SIGA2 708-2 fields of the data unit 700 correspond to the modulations of the corresponding fields in a data unit that conforms to the IEEE 802.11ac Standard (e.g., the data unit 500 of FIG. 5), legacy client stations configured to operate according to the IEEE 802.11a Standard and/or the IEEE 802.11n Standard will process the data unit 700 the same as they would the data unit 500 of FIG. 5. For example, a client station that conforms to the IEEE 802.11a Standard will recognize the legacy IEEE 802.11a Standard portion of the preamble of the data unit 700 and will set a duration of the data unit (or the data unit duration) according to a duration indicated in the L-SIG 706. For example, the legacy client station 25-4 will calculate a duration for the data unit based on a rate and a length (e.g., in number of bytes) indicated in the L-SIG field 706, according to an embodiment. In an embodiment, the rate and the length in the L-SIG field 706 are set such that a client station configured to operate according to a legacy communication protocol will calculate, based the rate and the length, a packet duration (T) that corresponds to, or at least approximates, the actual duration of the data unit 700. For example, the rate is set to indicate a lowest rate defined by the IEEE 802.11a Standard (i.e., 6 Mbps), and the length is set to a value computed such that packet duration computed using the lowest rate at least approximates the actual duration of the data unit 700, in one embodiment.

In an embodiment, a legacy client station that conforms to the IEEE 802.11a Standard, when receiving the data unit 700, will compute a packet duration for the data unit 700, e.g., using a rate field and a length field of L-SIG field 706, and will wait until the end of the computed packet duration before performing clear channel assessment (CCA), in an embodiment. Thus, in this embodiment, communication medium is protected against access by the legacy client station at least for the duration of the data unit 700. In an embodiment, the legacy client station will continue decoding the data unit 700, but will fail an error check (e.g., using a frame check sequence (FCS)) at the end of the data unit 700.

Similarly, a legacy client station configured to operate according to the IEEE 802.11n Standard, when receiving the data unit 700, will compute a packet duration (T) of the data unit 700 based on the rate and the length indicated in the L-SIG 706 of the data unit 700, in an embodiment. The legacy client station will detect the modulation of the first HE signal field (HE-SIGA1) 708-1 (BPSK) and will assume that the data unit 700 is a legacy data unit that conforms to the IEEE 802.11a Standard. In an embodiment, the legacy client station will continue decoding the data unit 700, but will fail an error check (e.g., using a frame check sequence (FCS)) at the end of the data unit. In any event, according to the IEEE 802.11n Standard, the legacy client station will wait until the end of a computed packet duration (T) before performing clear channel assessment (CCA), in an embodiment. Thus, communication medium will be protected from access by the legacy client station for the duration of the data unit 700, in an embodiment.

A legacy client station configured to operate according to the IEEE 802.11ac Standard but not the first communication protocol, when receiving the data unit 700, will compute a packet duration (T) of the data unit 700 based on the rate and the length indicated in the L-SIG 706 of the data unit 700, in an embodiment. However, the legacy client station will not be able to detect, based on the modulation of the data unit 700, that the data unit 700 does not conform to the IEEE 802.11ac Standard, in an embodiment. In some embodiments, one or more HE signal fields (e.g., the HE-SIGA1 and/or the HE-SIGA2) of the data unit 700 is/are formatted to intentionally cause the legacy client station to detect an error when decoding the data unit 700, and to therefore stop decoding (or "drop") the data unit 700. For example, HE-SIGA 708 of the data unit 700 is formatted to intentionally cause an error when a legacy device according to the IEEE 802.11ac Standard attempts to decode the SIGA field 708, in an embodiment. Further, according to the IEEE 802.11ac Standard, when an error is detected in decoding the VHT-SIGA field, the client station will drop the data unit 700 and will wait until the end of a computed packet duration (T), calculated, for example, based on a rate and a length indicated in the L-SIG 706 of the data unit 700, before performing clear channel assessment (CCA), in an embodiment. Thus, communication medium will be protected from access by the legacy client station for the duration of the data unit 700, in an embodiment.

Figure 8:
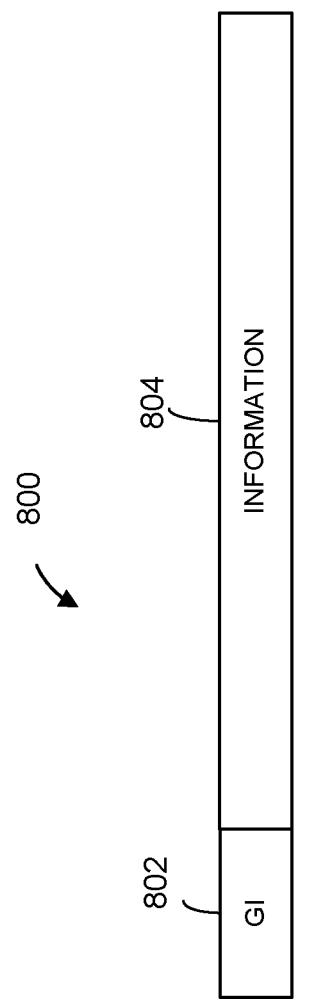
FIG. 8 is a block diagram of an OFDM symbol, according to an embodiment.

FIG. 8 is a diagram of an OFDM symbol 800, according to an embodiment. The data unit 700 of FIG. 7 includes OFDM symbols such as the OFDM symbols 800, in an embodiment. The OFDM symbol 800 includes a guard interval (GI) portion 802 and an information portion 804. In an embodiment, the guard interval 802 comprises a cyclic prefix repeating an end portion of the OFDM symbol. In an embodiment, the guard interval portion 802 is used to ensure orthogonality of OFDM tones at a receiving device (e.g., the client station 25-1) and to minimize or eliminate inter-symbol interference due to, for example, multi-path propagation in the communication channel via which the OFDM symbol 800 is transmitted (e.g., a communication channel from a transmitting device (e.g., the AP 14) to the receiving device). In an embodiment, the length of the guard interval portion 802 is selected based on expected worst case channel delay spread in the communication channel between the transmitting device and the receiving device. For example, a longer guard interval is selected for outdoor communication channels typically characterized by longer channel delay spreads as compared to a shorter guard interval selected for indoor communication channels typically characterized by shorter channel delay spreads, in an embodiment. In an embodiment, the length of the guard interval portion 802 is selected based on a tone spacing (e.g., frequency spacing between adjacent sub-carriers of the OFDM data unit) with which the information portion 804 has been generated. For example, a longer guard interval is selected for a narrower tone spacing (e.g., an OFDM data unit having 256 tones or sub-carriers for a given bandwidth) as compared to a shorter guard interval for a wider tone spacing (e.g., an OFDM data unit having 64 tones for the given bandwidth).

According to an embodiment, the guard interval portion 802 corresponds to a short guard interval, a normal guard interval, or a long guard interval, depending on a transmission mode being utilized. In an embodiment, the short guard interval or the normal guard interval is used for indoor communication channels, communication channels with relatively short channel delay spreads, or communication channels having suitably high SNR values, and the long guard interval is used for outdoor communication channels, communication channels with relatively long delay spreads, or communication channels not having suitably high SNR values. In an embodiment, the normal guard interval or the short guard interval is used for some or all OFDM symbols of an HE data unit (e.g., the HE data unit 700) when the HE data unit is transmitted in the first transmission mode, and the long guard interval is used for at least some OFDM symbols of the HE data unit when the HE data unit is transmitted in the second transmission mode.

In an embodiment, the short guard interval (SGI) has a length of 0.4 µs, the normal guard interval has a length of 0.8 µs and the long guard interval (LGI) has a length of 1.2 µs or 1.8 µs. In an embodiment, the information portion 804 has a length of 3.2 µs. In other embodiments, the information portion 804 has an increased length that corresponds to the tone spacing with which the information portion 804 has been generated. In an embodiment, the remaining length of the information portion 804 is filled with a copy of a received time-domain signal (e.g., the information portion 804 contains two copies of the received time-domain signal). In other embodiments, other suitable lengths for the SGI, the NGI, the LGI, and/or the information portion 804 are utilized. In some embodiments, the SGI has a length that is 50% of the length of the NGI, and the NGI has a length that is 50% of the length of the LGI. In other embodiments, the SGI has a length that is 75% or less of the length of the NGI, and the NGI has a length that is 75% or less of the length of the LGI. In other embodiments, the SGI has a length that is 50% or less of the length of the NGI, and the NGI has a length that is 50% or less of the LGI.

In other embodiments, OFDM modulation with reduced tone spacing is used for OFDM symbols in different portions of the data unit. For example, a legacy portion of the preamble of the data unit for a 20 MHz bandwidth OFDM data unit corresponds to a 64-point discrete Fourier transform (DFT), resulting in 64 OFDM tones (e.g., indices −32 to +31), whereas a non-legacy portion of the preamble and a non-legacy data portion of the data unit use a 256-point DFT for a 20 MHz bandwidth OFDM data unit, resulting in 256 OFDM tones (e.g., indices −128 to +127 or other suitable values) in the same bandwidth. In this case, tone spacing in the non-legacy OFDM symbols is reduced by a factor of four (¼) compared to legacy OFDM symbols.

Figure 9:
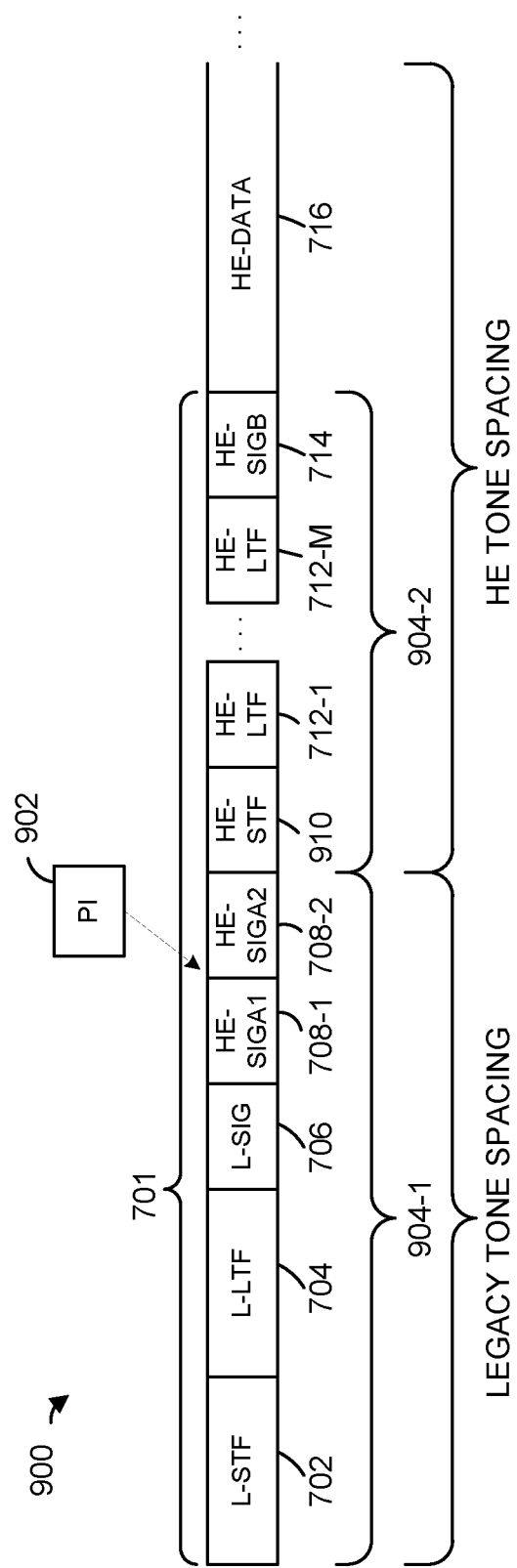
FIG. 9 is a diagram illustrating an example data unit in which a legacy tone spacing is used for at least a portion of a preamble of the data unit and a non-legacy tone spacing is used for at least a portion of the preamble, according to an embodiment.

FIG. 9 is a diagram illustrating an example data unit 900 in which a legacy tone spacing is used for at least a portion of a preamble of the data unit and a non-legacy tone spacing is used for at least a portion of the preamble, according to an embodiment. In various embodiments, the legacy tone spacing is a multiple of the non-legacy tone spacing to increase bandwidth efficiency. The data unit 900 is generally the same as the data unit 700 of FIG. 7A and includes like-numbered elements with the data unit 700 of FIG. 7A. The HE-SIGA field 708 (e.g., the HE-SIGA1 708-1 or the HE-SIGA2 708-2) of the data unit 900 includes a periodicity indication (PI) 902. According to an embodiment, the periodicity indication 902 is set to identify a periodicity selected from a plurality of different periodicities for a HE-STF field 910. In an embodiment, the periodicity indication 902 comprises one bit, wherein a first value of the bit indicates a first periodicity and a second value of the bit indicates a second periodicity, where the second periodicity is longer than the first periodicity. In some embodiments, the periodicity indication 902 is combined with a modulation and coding scheme (MCS) indicator. In an embodiment, for example, the first periodicity corresponds to MCS values for high SNR values, while the second periodicity corresponds to MCS values for low SNR values. In other embodiments, the periodicity indication 902 has a plurality of bits that indicate one of the plurality of different periodicities.

In various embodiments, the periodicity of the HE-STF field 910 corresponds to tone spacings used for the data unit 900. As illustrated in FIG. 9, a preamble 904 of the data unit 900 includes a legacy tone spacing portion 904-1 and a non-legacy tone spacing portion 904-2. The legacy tone spacing portion 904-1 includes the L-STF field 702, the L-LTF field 704, the L-SIG field 706, and the HE-SIGAs 708. The non-legacy tone spacing portion 904-2 includes the HE-STF 910, the M HE-LTFs 712, and the HE-SIGB 714. The legacy tone spacing portion 904-1 is generated with a first tone spacing, while the non-legacy tone spacing portion and the data portion 716 are generated with a different, second tone spacing (e.g., HE tone spacing), in the illustrated embodiment. In various embodiments and/or scenarios, the first tone spacing is an integer multiple M of the second tone spacing. For example, in an embodiment, the first tone spacing is a multiple of four (i.e., M=4) compared to the second tone spacing and thus the tone spacing of OFDM symbols for the data portion 716 and at least some of the non-legacy preamble 904-2 is reduced by a factor of four (¼) compared to legacy OFDM symbols. In other embodiments, the integer tone multiple M is two, three, five, or another suitable value. In some embodiments, the multiple M is not an integer, but is a positive, real number. In an illustrative embodiment, the first tone spacing is a legacy tone spacing of 312.5 KHz for a 64-point DFT across a bandwidth of 20 MHz, M is equal to four, and the second tone spacing is 78.125 KHz. In some embodiments, the tone spacing and symbol duration of the HE-STF 910 is different from other non-legacy fields, such as the M HE-LTFs 712, the HE-SIGB 714, and data portion 716.

In various embodiments and/or scenarios, the AP 14 generates the HE-STF 910 to conform to the HE communication protocol, to have an integer number of OFDM symbols N, to have a periodicity $H_P$, and to be based on a frequency sequence having non-zero values at an integer interval K. In at least some embodiments, the periodicity $H_P$ is selected to be i) proportional to a legacy periodicity $L_P$ of the L-STF 702 and the interval K, and ii) inversely proportional to the tone multiple M. In an embodiment, the periodicity $H_P$ is determined as:

$$H_P = \frac{4 \cdot M \cdot L_P}{K}.$$

For example, in an illustrative embodiment, the legacy periodicity is equal to 0.8 microseconds, the tone multiple M is equal to four, and the interval K is equal to 16, thus the periodicity $H_P$ of the HE-STF 910 is equal to 0.8 microseconds. In another embodiment, the legacy periodicity is equal to 0.8 microseconds, the tone multiple M is equal to four, and the interval K is equal to 8, thus the periodicity $H_P$ of the HE-STF 910 is equal to 1.6 microseconds. In yet another embodiment, the legacy periodicity is equal to 0.8 microseconds, the tone multiple M is equal to four, and the interval K is equal to 4, thus the periodicity $H_P$ of the HE-STF 910 is equal to 3.2 microseconds.

FIG. 10A is a diagram illustrating an example frequency sequence 1000 for a non-legacy short training field (e.g., the HE-STF 910) having a first periodicity, according to an embodiment. The frequency sequence 1000 has non-zero values for tones at an interval K across at least a portion of a whole bandwidth of the OFDM symbol. In the illustrated embodiment, the whole bandwidth of the OFDM symbol is 20 MHz, the multiple M is equal to four (i.e., 256 tones), and the interval K is equal to 16, which corresponds to a time domain periodicity equal to 0.8 microseconds for the HE-STF 910. In various embodiments, the AP 14 transmits an integer number N repetitions of an OFDM symbol using the frequency sequence 1000 as the HE-STF 910, where N is at least five. For example, in various embodiments and/or scenarios, the HE-STF 910 includes five, six, seven, eight, nine, ten or more instances of the frequency sequence 1000 such that the HE-STF 910 has a total duration of 4 microseconds (5*0.8), 4.8 microseconds (6*0.8), 5.6 microseconds (7*0.8), 6.4 microseconds (8*0.8), 7.2 microseconds (9*0.8), or 8.0 microseconds (10*0.8), or more, respectively. In some embodiments, the AP 14 selects the number N repetitions based on the deployment usage, signal strength, SNR, distance to communication devices, or other suitable factors. For example, in an embodiment, the AP 14 selects a generally lower number N for indoor deployments, high signal strength, high SNR, or short distances to communication devices and selects a generally higher number N for outdoor deployments, low signal strength, low SNR, or long distances to communication devices.

In some embodiments, one or more tones at a direct current (DC) tone (i.e., tone 0 as illustrated) or tones neighboring the DC tone (e.g., center tones) are omitted from the HE-STF 910 (i.e., provided with a null value, zero value, or near-zero value). In some embodiments, one or more tones adjacent to edges of the whole bandwidth of the OFDM symbol (i.e., guard tones) are omitted from the HE-STF 910. For example, in an embodiment, the DC tone and guard tones at ±112, −128 and +127 are omitted. In another embodiment, the DC tone and guard tones at −128 and +127 are omitted. In an embodiment, center tones and guard tones are omitted from the frequency sequence 1000 such that the HE-STF 910 and the L-STF 702 have a similar frequency sequence having 12 non-zero tones per 20 MHz sub-band. In some embodiments, the whole bandwidth of the OFDM symbol is a multiple of 20 MHz, for example, 40 MHz, 60 MHz, 80 MHz, etc. and the frequency sequence 1000 is duplicated to occupy the whole bandwidth. In an embodiment, at least some of the duplicated instances of the frequency sequence 1000 are phase rotated, similar to phase rotation defined in the IEEE 802.11ac Standard, to reduce a peak to average power ratio (PAPR) of the OFDM symbol.

FIG. 10B is a diagram illustrating another example frequency sequence 1025 for a non-legacy short training field (e.g., the HE-STF 910) having the first periodicity, according to an embodiment. The frequency sequence 1025 is generally similar to the frequency sequence 1000 (i.e., multiple M is equal to four, interval K is equal to 16, and N is at least 5), but the whole bandwidth of the frequency sequence 1025 is 80 MHz, the DC tone is omitted, and outer guard tones at ±496, −512, and +511 are omitted, in the illustrated embodiment.

In various embodiments, the frequency sequence for the HE-STF 910 is selected to minimize the peak to average power ratio (PAPR) by using a value of $(1+j)/\sqrt{(2)}$ or $(-1-j)/\sqrt{(2)}$ for each non-zero tone. In an embodiment, the frequency sequence for the HE-STF 910 having a periodicity equal to 0.8 microseconds and a whole bandwidth of 20 MHz is given by:

$HES_{-112:112} = \{-1-j, 0_{15}, 1+j, 0_{15}, 1+j, 0_{15}, -1-j, 0_{15}, 1+j, 0_{15}, -1-j, 0_{15}, 1+j, 0_{15}, 0, 0_{15}, -1-j, 0_{15}, -1-j, 0_{15}, 1+j, 0_{15}, 1+j, 0_{15}, 1+j, 0_{15}, 1+j\}/\sqrt{(2)}$ where $0_{15}$ indicates 15 contiguous zeros.

In an embodiment, the frequency sequence for the HE-STF 910 having a periodicity equal to 0.8 microseconds and a whole bandwidth of 40 MHz is given by:

$HES_{-240:240} = \{-1-j, 0_{15}, 1+j, 0_{15}, 1+j, 0_{15}, -1-j, 0_{15}, 1+j, 0_{15}, -1-j, 0_{15}, 1+j, 0_{15}, 1+j, 0_{15}, -1-j, 0_{15}, -1-j, 0_{15}, 1+j, 0_{15}, 1+j, 0_{15}, 1+j, 0_{15}, 1+j, 0_{15}, 0, 0_{15}, -1-j, 0_{15}, 1+j, 0_{15}, 1+j, 0_{15}, -1-j, 0_{15}, 1+j, 0_{15}, -1-j, 0_{15}, 1+j, 0_{15}, 1+j, 0_{15}, -1-j, 0_{15}, -1-j, 0_{15}, 1+j, 0_{15}, 1+j, 0_{15}, 1+j\}/\sqrt{(2)}$ where $0_{15}$ indicates 15 contiguous zeros.

In an embodiment, the frequency sequence for the HE-STF 910 having a periodicity equal to 0.8 microseconds and a whole bandwidth of 80 MHz is given by:

$HES_{-496:496} = \{-1-j, 0_{15}, 1+j, 0_{15}, 1+j, 0_{15}, -1-j, 0_{15}, 1+j, 0_{15}, -1-j, 0_{15}, 1+j, 0_{15}, 1+j, 0_{15}, 1+j, 0_{15}, 1+j, 0_{15}, 1+j, 0_{15}, -1-j, 0_{15}, -1-j, 0_{15}, 1+j, 0_{15}, 1+j, 0_{15}, -1-j, 0_{15}, 1+j, 0_{15}, -1-j, 0_{15}, 1+j, 0_{15}, 1+j, 0_{15}, -1-j, 0_{15}, -1-j, 0_{15}, 1+j, 0_{15}, 1+j, 0_{15}, 0, 0_{15}, -1-j, 0_{15}, 1+j, 0_{15}, 1+j, 0_{15}, -1-j, 0_{15}, 1+j, 0_{15}1+j, 0_{15}, -1-j, 0_{15}, -1-j, 0_{15}, 1+j, 0_{15}, 1+j, 0_{15}, 1+j, 0_{15}, -1-j, 0_{15}, -1-j, 0_{15}, 1+j, 0_{15}, 1+j, 0_{15}, -1-j, 0_{15}, 1+j, 0_{15}, -1+j, 0_{15}, 1+j, 0_{15}, 1+j, 0_{15}, -1+j, 0_{15}, -1-j, 0_{15}, 1+j, 0_{15}, 1+j, 0_{15}, 1+j, 0_{15}, 1+j\}/\sqrt{(2)}$ where $0_{15}$ indicates 15 contiguous zeros.

Figure 11A:
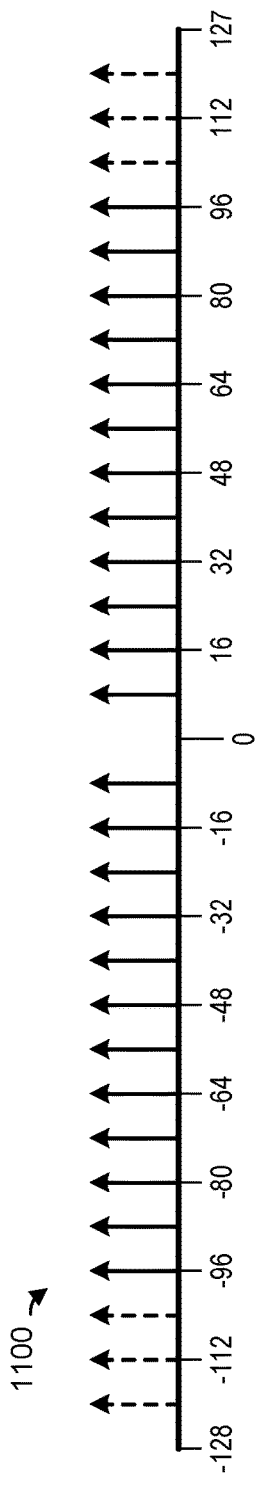
FIG. 11A is a diagram illustrating an example frequency sequence for a non-legacy short training field having a second periodicity, according to an embodiment.

FIG. 11A is a diagram illustrating an example frequency sequence 1100 for a non-legacy short training field (e.g., the HE-STF 910) having a second periodicity, according to an embodiment. The frequency sequence 1100 is generally similar to the frequency sequence 1000 (i.e., whole bandwidth of 20 MHz, multiple M is equal to four), but the number N is at least three and the interval K is equal to eight, which corresponds to a time domain periodicity equal to 1.6 microseconds for the HE-STF 910, in the illustrated embodiment. In various embodiments and/or scenarios, the HE-STF 910 includes three, four, five or more instances of the frequency sequence 1100 such that the HE-STF 910 has a total duration of 4.8 microseconds (3*1.6), 6.4 microseconds (4*1.6), 8 microseconds (5*1.6), or more, respectively.

In a similar manner as described above with reference to the frequency sequence 1000, in various embodiments, one or more tones at the DC tone, neighboring the DC tone, or tones adjacent to edges of the whole bandwidth (e.g., tones at ±104, ±112, or ±120) are omitted from the frequency sequence 1100. In various embodiments, for example, the HE-STF 910 is generated using the frequency sequence 1100 having 24 tones (omitting the DC tone and guard tones at ±104, ±112, and ±120), 26 tones (omitting the DC tone and guard tones at ±112 and ±120), 28 tones (omitting the DC tone and guard tones at ±120), 30 tones (omitting the DC tone), or another suitable number of tones. In some embodiments, the whole bandwidth of the OFDM symbol is a multiple of 20 MHz, for example, 40 MHz, 60 MHz, 80 MHz, etc. and the frequency sequence 1100 is duplicated to occupy the whole bandwidth. In an embodiment, at least some of the duplicated instances of the frequency sequence 1100 are phase rotated, similar to 802.11ac phase rotation, to reduce a peak to average power ratio (PAPR) of the OFDM symbol.

Figure 11B:
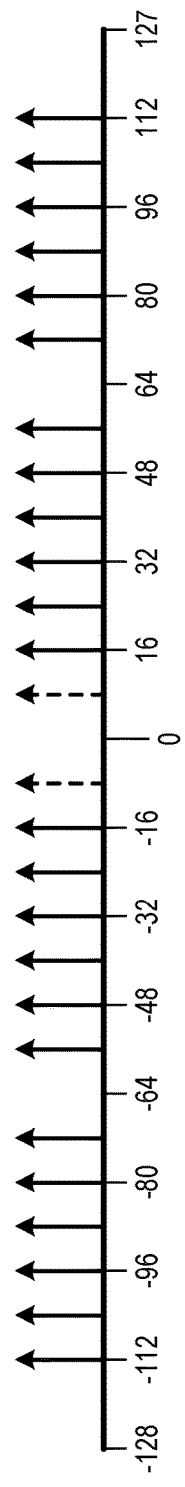
FIG. 11B is a diagram illustrating another example frequency sequence for a non-legacy short training field having the second periodicity, according to an embodiment.

FIG. 11B is a diagram illustrating another example frequency sequence 1125 for a non-legacy short training field (e.g., the HE-STF 910) having the second periodicity, according to an embodiment. The frequency sequence 1125 is generally similar to the frequency sequence 1100 (i.e., whole bandwidth of 20 MHz, multiple M is equal to four, interval K is equal to eight, and N is at least three), but the frequency sequence 1125 is based on a frequency sequence for a legacy short training field that occupies a whole bandwidth of 40 MHz. For example, in an embodiment, the frequency sequence 1125 has 24 tones based on the frequency sequence for the HT-STF 310 (FIG. 3) or VHT-STF 510 (FIG. 5) for a 40 MHz whole bandwidth, as defined in equation 20-20 of the IEEE 802.11-2012 standard, the disclosure of which is incorporated herein by reference in its entirety. In another embodiment, the frequency sequence 1125 has 26 tones based on the frequency sequence for the HT-STF 310 (FIG. 3) or VHT-STF 510 (FIG. 5) for a 40 MHz whole bandwidth and also including non-zero tones neighboring the DC tone at ±8.

Figure 11C:
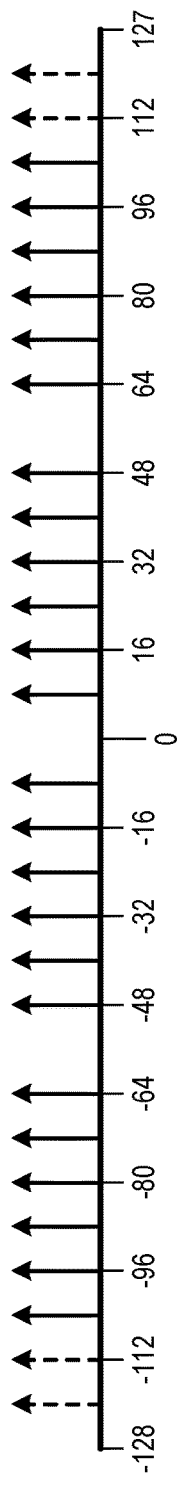
FIG. 11C is a diagram illustrating an example frequency sequence for a non-legacy short training field having the second periodicity, according to an embodiment.

FIG. 11C is a diagram illustrating an example frequency sequence 1150 for a non-legacy short training field (e.g., the HE-STF 910) having the second periodicity, according to an embodiment. The frequency sequence 1150 is generally similar to the frequency sequence 1125 (i.e., whole bandwidth of 20 MHz, multiple M is equal to four, interval K is equal to eight, and N is at least three). The frequency sequence 1150 has 24 tones based on the frequency sequence for the legacy short training field, but is shifted inwards towards the DC tone by eight tones, in the illustrated embodiment. In another embodiment, the frequency sequence 1150 has 26 tones based on the frequency sequence for the HT-STF 310 (FIG. 3) or VHT-STF 510 (FIG. 5) for a 40 MHz whole bandwidth that is shifted inwards toward the DC tone by eight tones and also including non-zero tones adjacent to edges of the whole bandwidth (e.g., tones at ±112, ±120, or tones at both ±112 and ±120).

In other embodiments, the frequency sequence 1150 is shifted outwards from the DC tone by 8, 16, 24, or another suitable number of tones.

In various embodiments, the frequency sequence for the HE-STF 910 is selected to minimize the peak to average power ratio (PAPR) by using a value of $(1+j)/\sqrt{2}$ or $(-1-j)/\sqrt{2}$ for each non-zero tone. In one such embodiment, the frequency sequence for the HE-STF 910 having a periodicity equal to 1.6 microseconds and a whole bandwidth of 20 MHz is given by:

$HES_{-120:120} = \{-1-j, 0_7, -1-j, 0_7, -1-j, 0_7, -1-j, 0_7, -1-j,$
$0_7, -1-j, 0_7, -1-j, 0_7, -1-j, 0_7, 1+j, 0_7, 1+j, 0_7, 1+j, 0_7,$
$-1-j, 0_7, -1-j, 0_7, 1+j, 0_7, 1+j, 0_7, 0, 0_7, -1-j, 0_7, 1+j,$
$0_7, -1-j, 0_7, -1-j, 0_7, 1+j, 0_7, 1+j, 0_7, -1-j, 0_7, 1+j, 0_7,$
$-1-j, 0_7, -1-j, 0_7, 1+j, 0_7, -1-j, 0_7, 1+j, 0_7, -1-j, 0_7,$
$1+j\}/\sqrt{2}$ where $0_7$ indicates seven contiguous zeros.

In an embodiment, the frequency sequence for the HE-STF 910 having a periodicity equal to 1.6 microseconds and a whole bandwidth of 40 MHz is given by:

$HES_{-240:240} = \{-1-j, 0_7, -1-j, 0_7, -1-j, 0_7, -1-j, 0_7, -1-j,$
$0_7, -1-j, 0_7, -1-j, 0_7, 1+j, 0_7, 1+j, 0_7, 1+j, 0_7, -1-j, 0_7,$
$-1-j, 0_7, 1+j, 0_7, 1+j, 0_7, -1-j, 0_7, -1-j, 0_7, 1+j, 0_7,$
$-1-j, 0_7, -1-j, 0_7, 1+j, 0_7, 1+j, 0_7, -1-j, 0_7, 1+j, 0_7,$
$-1-j, 0_7, -1-j, 0_7, 1+j, 0_7, -1-j, 0_7, 1+j, 0_7, -1-j, 0_7,$
$1+j, 0_7, 0, 0_7, -1-j, 0_7, -1-j, 0_7, -1-j, 0_7, -1-j, 0_7,$
$-1-j, 0_7, -1-j, 0_7, -1-j, 0_7, -1-j, 0_7, 1+j, 0_7, 1+j, 0_7,$
$1+j, 0_7, -1-j, 0_7, -1-j, 0_7, 1+j, 0_7, 1+j, 0_7, -1-j, 0_7,$
$-1-j, 0_7, 1+j, 0_7, -1-j, 0_7, -1-j, 0_7, 1+j, 0_7, 1+j, 0_7,$
$-1-j, 0_7, 1+j, 0_7, -1-j, 0_7, -1-j, 0_7, 1+j, 0_7, -1-j, 0_7,$
$1+j, 0_7, -1-j\}/\sqrt{2}$ where $0_7$ indicates seven contiguous zeros.

In an embodiment, the frequency sequence for the HE-STF 910 having a periodicity equal to 1.6 microseconds and a whole bandwidth of 80 MHz is given by:

$HES_{-496:496} = \{-1-j, 0_7, -1-j, 0_7, -1-j, 0_7, -1-j, 0_7, -1-j,$
$0_7, -1-j, 0_7, -1-j, 0_7, 1+j, 0_7, 1+j, 0_7, 1+j, 0_7, -1-j, 0_7,$
$-1-j, 0_7, 1+j, 0_7, 1+j, 0_7, -1-j, 0_7, -1-j, 0_7, 1+j, 0_7,$
$-1-j, 0_7, -1-j, 0_7, 1+j, 0_7, 1+j, 0_7, -1-j, 0_7, 1+j, 0_7,$
$-1-j, 0_7, -1-j, 0_7, 1+j, 0_7, -1-j, 0_7, 1+j, 0_7, -1-j, 0_7,$
$1+j, 0_7, 1+j, 0_7, -1-j, 0_7, -1-j, 0_7, -1-j, 0_7, -1-j, 0_7,$
$-1-j, 0_7, -1-j, 0_7, -1-j, 0_7, -1-j, 0_7, 1+j, 0_7, 1+j, 0_7,$
$1+j, 0_7, -1-j, 0_7, -1-j, 0_7, 1+j, 0_7, 1+j, 0_7, -1-j, 0_7,$
$-1-j, 0_7, 1+j, 0_7, -1-j, 0_7, -1-j, 0_7, 1+j, 0_7, 1+j, 0_7,$
$-1-j, 0_7, 1+j, 0_7, -1-j, 0_7, -1-j, 0_7, 1+j, 0_7, 1+j, 0_7,$
$1+j, 0_7, -1-j, 0_7, 1+j, 0_7, 0, 0_7, -1-j, 0_7, -1-j, 0_7, -1-j,$
$0_7, -1-j, 0_7, -1-j, 0_7, -1-j, 0_7, -1-j, 0_7, -1-j, 0_7, 1+j,$
$0_7, 1+j, 0_7, 1+j, 0_7, -1-j, 0_7, -1-j, 0_7, 1+j, 0_7, 1+j, 0_7,$
$-1-j, 0_7, -1-j, 0_7, 1+j, 0_7, -1-j, 0_7, -1-j, 0_7, 1+j, 0_7,$
$1+j, 0_7, -1-j, 0_7, 1+j, 0_7, -1-j, 0_7, -1-j, 0_7, 1+j, 0_7,$
$-1-j, 0_7, 1+j, 0_7, -1-j, 0_7, 1+j, 0_7, -1-j, 0_7, -1-j, 0_7,$
$-1-j, 0_7, -1-j, 0_7, -1-j, 0_7, -1-j, 0_7, -1-j, 0_7, -1-j, 0_7,$
$-1-j, 0_7, 1+j, 0_7, 1+j, 0_7, 1+j, 0_7, -1-j, 0_7, -1-j, 0_7, 1+j,$
$0_7, 1+j, 0_7, -1-j, 0_7, -1-j, 0_7, 1+j, 0_7, -1-j, 0_7, -1-j,$
$0_7, 1+j, 0_7, 1+j, 0_7, -1-j, 0_7, 1+j, 0_7, -1-j, 0_7, -1-j, 0_7,$
$1+j, 0_7, -1-j, 0_7, 1+j, 0_7, -1-j\}/\sqrt{2}$ where $0_7$ indicates seven contiguous zeros.

Figure 12A:
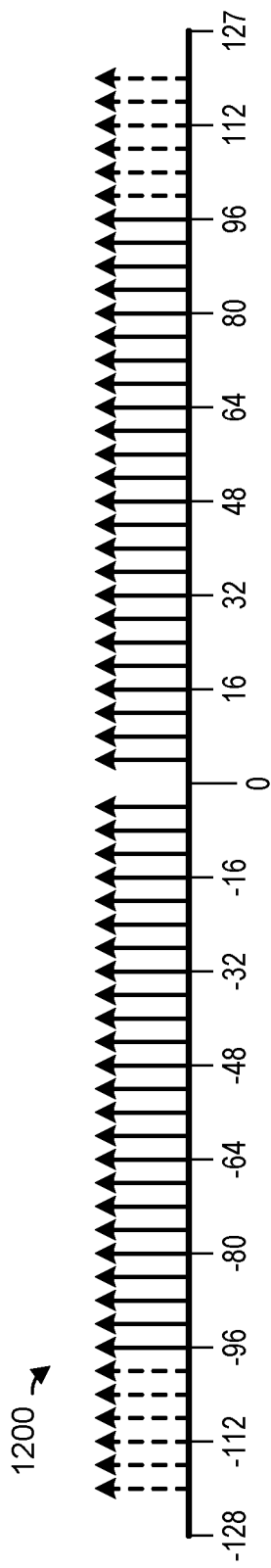
FIG. 12A is a diagram illustrating an example frequency sequence for a non-legacy short training field having a third periodicity, according to an embodiment.

FIG. 12A is a diagram illustrating an example frequency sequence 1200 for a non-legacy short training field (e.g., the HE-STF 910) having a third periodicity, according to an embodiment. The frequency sequence 1200 is generally similar to the frequency sequence 1000 (i.e., whole bandwidth of 20 MHz, multiple M is equal to four, but the number N is at least two and the interval K is equal to four, which corresponds to a time domain periodicity equal to 3.2 microseconds for the HE-STF 910, in the illustrated embodiment. In some embodiments, the whole bandwidth of the OFDM symbol is a multiple of 20 MHz, for example, 40 MHz, 60 MHz, 80 MHz, etc. and the frequency sequence 1200 is duplicated to occupy the whole bandwidth. In an embodiment, at least some of the duplicated instances of the frequency sequence 1200 are phase rotated, similar to 802.11ac phase rotation, to reduce a peak to average power ratio (PAPR) of the OFDM symbol.

In various embodiments and/or scenarios, the HE-STF 910 includes two, three, four, or more instances of the frequency sequence 1200 such that the HE-STF 910 has a total duration of 6.4 microseconds (2*3.2), 9.6 microseconds (3*3.2), 12.8 microseconds (4*3.2), or more, respectively. In a similar manner as described above with reference to the frequency sequence 1000, in various embodiments, one or more tones at the DC tone, neighboring the DC tone, or adjacent to edges of the whole bandwidth (e.g., tones at ±100, ±104, ±108, ±112, ±116, ±120) are omitted from the frequency sequence 1200. In various embodiments, for example, the HE-STF 910 is generated using the frequency sequence 1200 having 48 tones (omitting the DC tone and guard tones at ±100, ±104, ±108, ±112, ±116, ±120), 50 tones (omitting the DC tone and guard tones at ±104, ±108, ±112, ±116, ±120), 52 tones (omitting the DC tone and guard tones at ±108, ±112, ±116, ±120), 54 tones (omitting the DC tone and guard tones at ±112, ±116, ±120), 56 tones (omitting the DC tone and guard tones at ±116, ±120), 58 tones (omitting the DC tone and guard tones at ±120), 60 tones (omitting the DC tone), or another suitable number of tones.

Figure 12B:
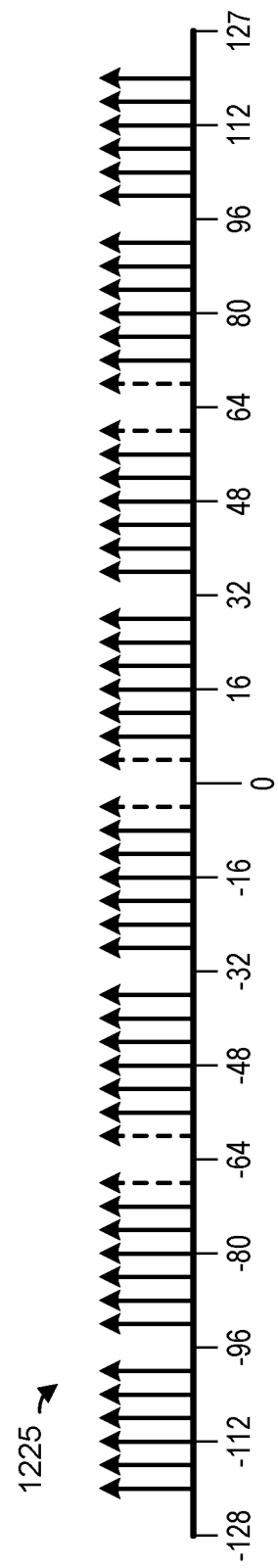
FIG. 12B is a diagram illustrating another example frequency sequence for a non-legacy short training field having the third periodicity, according to an embodiment.

FIG. 12B is a diagram illustrating another example frequency sequence 1225 for a non-legacy short training field (e.g., the HE-STF 910) having the third periodicity, according to an embodiment. The frequency sequence 1225 is generally similar to the frequency sequence 1200 (i.e., whole bandwidth of 20 MHz, multiple M is equal to four, interval K is equal to four, and N is at least two), but the frequency sequence 1225 is based on a frequency sequence for a legacy short training field that occupies a whole bandwidth of 80 MHz. For example, in an embodiment, the frequency sequence 1225 is based on the frequency sequence for the VHT-STF 510 (FIG. 5) for an 80 MHz whole bandwidth, as defined in equation 22-31 of the IEEE 802.11ac standard, the disclosure of which is incorporated herein by reference in its entirety. In an embodiment, the frequency sequence 1225 is based on the frequency sequence for the VHT-STF 510 (FIG. 5) for an 80 MHz whole bandwidth and also includes non-zero tones adjacent to the DC tone at ±4.

In another embodiment, the frequency sequence 1225 is based on the frequency sequence for the VHT-STF 510 (FIG. 5) for an 80 MHz whole bandwidth and is shifted inwards to the DC tone by 4 tones. In other embodiments, the frequency sequence 1225 is based on the frequency sequence for the VHT-STF 510 (FIG. 5) for an 80 MHz whole bandwidth and is shifted outwards from the DC tone by 4, 8, 12, 16, or another suitable number of tones. The frequency sequence for the 80 MHz VHT-STF is itself based on a duplication of the frequency sequence for the 40 MHz VHT-STF. In an embodiment, the frequency sequence 1225 is based on the frequency sequence for the VHT-STF 510 (FIG. 5) for the 80 MHz whole bandwidth and also includes non-zero tones adjacent to the DC tone at ±4 and adjacent to the DC tones of the frequency sequence for the 40 MHz VHT-STF, for example, at ±60 and ±68.

In the embodiments described above with respect to FIGS. 10A, 10B, 11A, 11B, 11C, 12A, and 12B, the periodicity $H_P$ is equal to 0.8 microseconds, 1.6 microseconds, or 3.2 microseconds. In various embodiments and/or scenarios, the AP 14 selects a transmission mode that corresponds to a periodicity value of a plurality of periodicity values. The AP 14 generates the HE-STF 910 with the corresponding periodicity value and also generates the periodicity indication 902 to indicate the periodicity value or the transmission mode. In various embodiments and/or scenarios, the AP 14 selects the transmission mode based on a deployment usage of the communication channel. For example, in an embodiment, a first transmission mode corresponds to a generally short periodicity (e.g., 0.8 microseconds) for low density sampling of the HE-STF 910 and is generally used with communication channels characterized by shorter channel delay spreads (e.g., indoor communication channels) or generally higher SNR values. In this embodiment, a second transmission mode corresponds to a generally longer periodicity (e.g., 1.6 microseconds or 3.2 microseconds) for high density sampling of the HE-STF 910 and is generally used with communication channels characterized by generally longer channel delay spreads (e.g., outdoor communication channels) or generally lower SNR values. In some scenarios, the first transmission mode helps to reduce signaling overhead and increase bandwidth efficiency and the second transmission mode helps to improve decoding reliability for power estimation.

The periodicity indication 902 is an explicit indication of the transmission mode and/or periodicity, in at least some embodiments. In an embodiment, the AP 14 repeats the HE-SIGA1 field 708-1 for two OFDM symbols to indicate the second transmission mode and does not repeat the HE-SIGA1 field 708-1 to indicate the first transmission mode. In this embodiment, a client station that receives the data unit 900 auto-detects the repeated HE-SIGA1 field 708-1 for the second transmission mode and then prepares to decode the HE-STF 910 using the corresponding periodicity and/or integer number N repetitions. In another embodiment, a last OFDM symbol of the HE-SIGA field 708 is modulated using QBPSK rotation to indicate the first transmission mode while BPSK rotation indicates the second transmission mode. In other embodiments, the periodicity indication 902 is an implicit indication of the transmission mode or periodicity. In an embodiment, for example, the first transmission mode corresponds to the short periodicity and a short guard interval, while the second transmission mode corresponds to the long periodicity and a long guard interval. In this embodiment, the client station 25 decodes the HE-STF 910 using the short periodicity upon detection of the short guard interval and decodes the HE-STF 910 using the long periodicity upon detection of the long guard interval.

In some embodiments, the transmission modes correspond to both a value for the periodicity and a value for the integer number N repetitions of the OFDM symbol for the HE-STF 910. In other embodiments, the AP 14 selects from three, four, or more transmission modes, each corresponding to a different periodicity and/or integer number N repetitions. In these embodiments, the periodicity indication 902 indicates both the periodicity and the integer number N repetitions. For example, in an embodiment, the periodicity indication 902 is a field having one bit that indicates the periodicity (e.g., "0" for a short periodicity and "1" for a long periodicity) and also having two bits that indicate the integer number N repetitions (e.g., 1, 2, 3, or 4 repetitions represented in binary). In another embodiment, the periodicity indication 902 is a field having two bits that indicate one of three periodicities (e.g., "00" for a 0.8 microseconds, "01" for 1.6 microseconds, and "11" for 3.2 microseconds) and also having two bits that correspond to predetermined numbers of N repetitions (e.g., 1, 2, 4, or 8 repetitions). In other embodiments, the periodicity indication 902 has one, two, three, or more bits that indicate the periodicity and one, two, three, or more bits that indicate the integer number N repetitions.

In various embodiments or scenarios, the AP 14 transmits one or more of the data units 900 to the client station 25 as a downlink data unit. In some embodiments, the downlink data unit 900 is a downlink multi-user multiple input, multiple output data (MU-MIMO) data unit. In some embodiments, the downlink data unit 900 is a downlink orthogonal frequency division multiple access (OFDMA) data unit. In some embodiments, the downlink data unit 900 is a MU-MIMO OFDMA data unit. In some embodiments, the AP 14 transmits the HE-STF 910 using two or more transmit antennas of the AP 14 (or each transmit antenna of the AP 14). In an embodiment, the AP 14 modulates the HE-STF 910 and the data portion 716 using a same steering matrix (e.g., antenna mapping). In another embodiment where a tone used by the HE-STF 910 is not used by the data portion 716, the AP 14 uses a steering matrix for an adjacent or closest neighboring data tone. In yet another embodiment where a tone used by the HE-STF 910 is not used by the data portion 716, the AP 14 determines a random or pseudo-random steering matrix having a suitable dimension and normalization for the HE-STF 910. In another embodiment where a tone used by the HE-STF 910 is not used by the data portion 716, the AP 14 determines a steering matrix for the HE-STF 910 by interpolating steering matrices for neighboring data tones.

In some embodiments, the AP 14 uses a reduced number of steering matrices (i.e., fewer than the total number of OFDM tones) by using a same steering matrix for a plurality of consecutive tones. For example, in an embodiment, the AP 14 uses a steering matrix for a group of four, eight, sixteen, or another suitable number of consecutive tones. In some embodiments, the number of consecutive tones per steering matrix corresponds to the selected periodicity. In an embodiment where the selected periodicity is 0.8 microseconds, the number of consecutive tones per steering matrix group is four, eight, or sixteen tones. In another embodiment where the selected periodicity is 1.6 microseconds, the number of consecutive tones per steering matrix group is four or eight tones.

In various embodiments and/or scenarios, at least some frame types correspond to respective sets of transmission modes. For example, in an embodiment, a frame type of uplink multi-user (UL-MU) frames (e.g., uplink MU-MIMO frames and/or uplink OFDMA frames) corresponds to a plurality of transmission modes. In this embodiment, each transmission mode of the plurality of transmission modes corresponds to an HE-STF with a periodicity and/or OFDM symbol pattern that is different from the other transmission modes. In an embodiment, a client station 25 transmits an OFDM frame of the UL-MU frame type in response to a transmission mode frame transmitted by an AP 14. In various embodiments, the transmission mode frame is a trigger frame, control frame, management frame, or other suitable frame.

In various embodiments, the AP 14 explicitly identifies or "signals" the transmission mode to be used by the client station for the uplink multi-user frame. In some embodiments, the AP identifies the transmission mode in the trigger frame. In an embodiment, the AP 14 identifies the transmission mode in the PHY header of the trigger frame, for example, using the periodicity indication 902 as described above with respect to FIG. 9. In another embodiment, the AP 14 identifies the transmission mode in a MAC frame. In another embodiment, the AP 14 explicitly identifies the transmission mode in a control frame or management frame, for example, a beacon frame, a request to send (RTS) frame, or other suitable control and/or management frame.

In some embodiments, the AP 14 implicitly identifies the transmission mode. In an embodiment, the AP 14 generates the trigger frame so that a receiver (e.g., the client station) can decode or determine the transmission mode based on content of the trigger frame. In an embodiment, the content includes resource allocation information that implicitly identifies the transmission mode. The resource allocation information generally identifies OFDMA resource units (RUs) to be used by a plurality of client stations in response to the trigger frame. In some embodiments, the resource allocation information implicitly identifies the transmission mode based on an allocation status of a predetermined OFDMA RU. In an embodiment, the resource allocation information implicitly identifies i) a first transmission mode to be used by each of the plurality of client stations if the predetermined OFDMA RU (e.g., a center 26-tone RU) is allocated to any of the plurality of client stations, or ii) a second transmission mode to be used by each of the plurality of client stations if the predetermined OFDMA RU is not allocated to any of the plurality of client stations. In another embodiment, the resource allocation information implicitly identifies the first transmission mode for the client station to which the predetermined OFDMA RU (e.g., the center 26-tone RU) has been allocated and the second transmission mode for the remaining client stations of the plurality of client stations. In other embodiments, the AP 14 generates a control frame or management frame that implicitly identifies the transmission modes based on the content of the frame.

FIG. 13A is a diagram illustrating a time-domain function 1300 for a downlink non-legacy short training field (e.g., the HE-STF 910), according to an embodiment. In the time-domain function 1300, k is an integer tone index, $N_{HE-STF}^{Tone}$ corresponds to the frequency sequence for the HE-STF field 910, $N_{STS,total}(k)$ is a number of total spatial streams on the $k^{th}$ tone, $w_T$ is a windowing function, $N_{user}(k)$ is a number of users on the $k^{th}$ tone, $\alpha_k$ is a power boost factor for the $k^{th}$ tone, $HES_k$ is the HE-STF sequence on the $k^{th}$ tone, $Q_k^{(i_{seg})}$ is the steering matrix for the $k^{th}$ tone on segment $i_{seg}$, $Y_{k,BW}$ is a tone rotation on the $k^{th}$ tone within bandwidth segment BW, $\Delta_F$ is the tone spacing, $T_{CS,HE}$ is a cyclic shift per space time stream, $N_{SR}$ is a highest data subcarrier index, $M_u$ is a number of space time streams that have already been allocated to other users for the current data unit, m is an integer space time stream index, $\alpha_{k,u}$ is the power boost factor for client station u at the $k^{th}$ tone, and $\delta_{k,u}$ is equal to "1" if the client station u has an uplink grant on the $k^{th}$ tone, otherwise $\delta_{k,u}$ is equal to "0." In an embodiment, the tone rotation $Y_{k,BW}$ corresponds to the tone rotation defined in equations 22-14, 22-15, 22-16, and 22-17 of the IEEE 802.11ac standard, and the equations 22-14, 22-15, 22-16, and 22-17 of the IEEE 802.11ac standard are hereby incorporated by reference herein.

In some embodiments, the downlink data unit 900 is an orthogonal frequency division multiple access (OFDMA) data unit. In an embodiment, the AP 14 boosts a transmission power for each non-zero tone of the HE-STF 910 according to a power control function selected for OFDMA transmissions to a particular client station. For example, in an embodiment, a transmission power level assigned to each client station is $P_m$, m=1 . . . M, where M is a total number of client stations that are scheduled for the data unit. In this embodiment, the tones scheduled for each client station are $(f_{m-1}, f_m]$ and the AP 14 boosts the transmission power for tones of the HE-STF 910 at frequency f within $(f_{m-1}, f_m]$, by an amount corresponding to $P_m/(P_1+P_2+ \ldots +P_M)$.

In various embodiments or scenarios, the client station 25 transmits one or more of the data units 900 to the AP 14 as an uplink data unit. In some embodiments, the uplink data unit 900 is an uplink MU-MIMO data unit. In an embodiment, the client station 25 modulates the HE-STF 910 and the data portion 716 using a same steering matrix (e.g., antenna mapping). In some embodiments, the uplink data unit 900 is an uplink OFDMA data unit. In one such embodiment, the client station 25 transmits the HE-STF 910 i) only over tones assigned, allocated, or granted to the client station 25, and ii) with a transmission power boost to normalize the HE-STF 910 with the data portion 716. In other embodiments, the client station 25 transmits the HE-STF 910 over additional tones that have not been assigned, allocated, or granted to the client station 25 and uses a transmission power boost corresponding to the actual number of populated tones of the HE-STF 910.

For example, in an embodiment, the client station 25 transmits the HE-STF 910 using all tones of the corresponding frequency sequence. In another embodiment, the client station 25 transmits the HE-STF 910 using a predetermined minimum number of tones. In yet another embodiment, the client station 25 transmits the HE-STF 910 using a maximum of i) the tones assigned, allocated, or granted to the client station 25, and ii) the predetermined minimum number of tones. Where additional tones are used to transmit the HE-STF 910, the client station 25 transmits the additional tones using respective non-zero steering matrices. In an embodiment, the client station 25 extrapolates the non-zero steering matrices from the steering matrices corresponding to the assigned, allocated, or granted tones. In another embodiment, the client station 25 selects a random or pseudo-random steering matrix as the non-zero steering matrices. In yet another embodiment, the client station 25 selects columns of a fast Fourier transform matrix as the non-zero steering matrices.

FIG. 13B is a diagram illustrating a time-domain function 1350 for an uplink non-legacy short training field (e.g., the HE-STF 910), according to an embodiment. In the time-domain function 1350, k is an integer tone index, $N_{HE-STF}^{Tone}$ corresponds to the frequency sequence for the HE-STF field 910, $N_{STS,u}(k)$ is a number of spatial streams for the $u^{th}$ user (i.e., client station or communication device) on the $k^{th}$ tone, $w_T$ is a windowing function, $HES_k$ is the HE-STF sequence on the $k^{th}$ tone, $Q_k^{(i_{seg})}$ is the steering matrix for the $k^{th}$ tone on segment $i_{seg}$, $Y_{k,BW}$ is a tone rotation on the $k^{th}$ tone within bandwidth segment BW, $\Delta_F$ is the tone spacing, $T_{CS,HE}$ is a cyclic shift per space time stream, $N_{SR}$ is a highest data subcarrier index, m is an integer space time stream index, $\alpha_{k,u}$ is the power boost factor for client station u at the $k^{th}$ tone, and $\delta_{k,u}$ is equal to "1" if the client station u has an uplink grant on the $k^{th}$ tone, otherwise $\delta_{k,u}$ is equal to "0."

Figure 14:
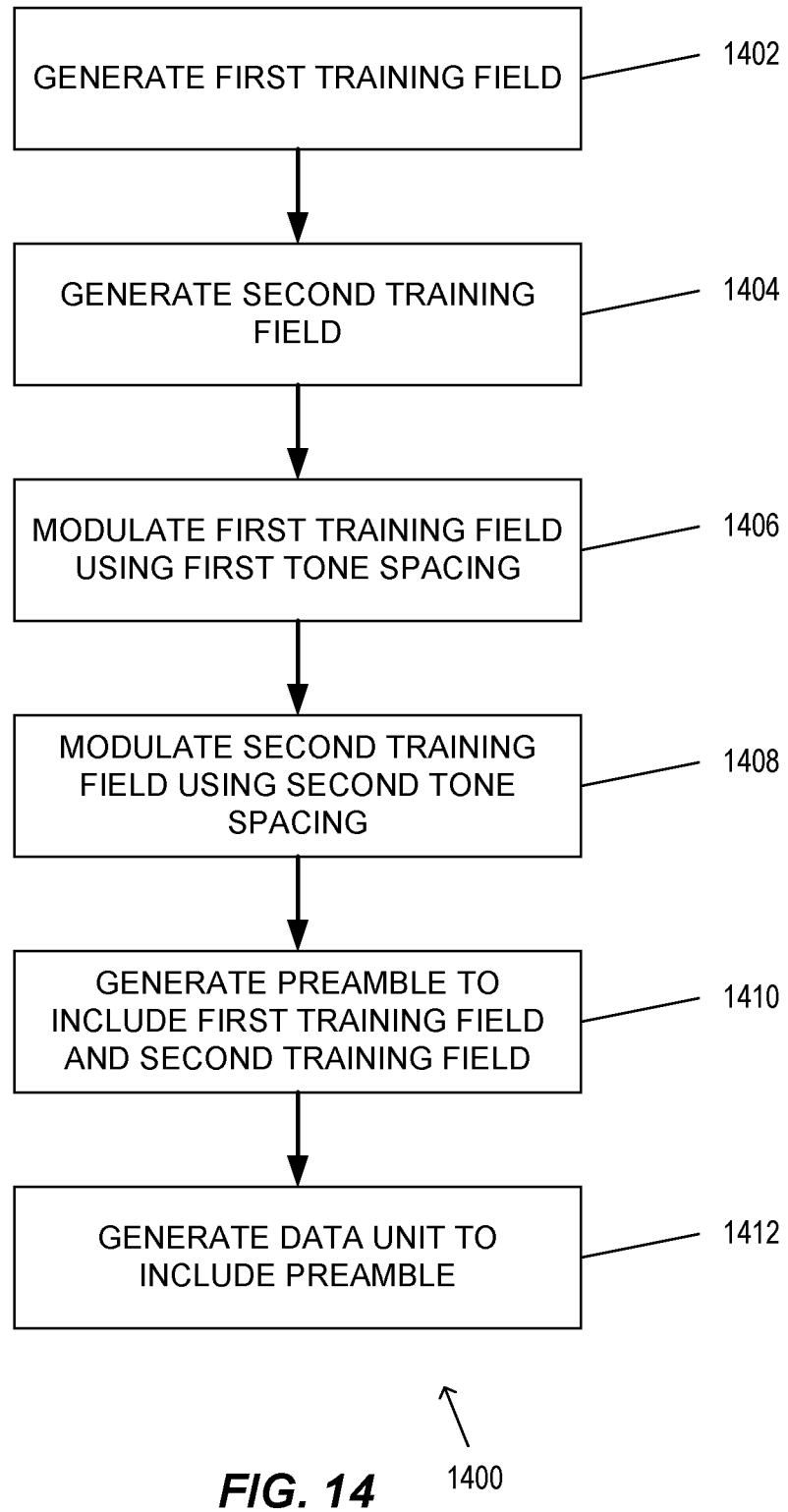
FIG. 14 is a flow diagram of an example method for generating a data unit that conforms to a first communication protocol for transmission via a communication channel, according to an embodiment.

FIG. 14 is a flow diagram of an example method 1400 for generating an OFDM data unit that conforms to a first communication protocol for transmission via a communication channel, according to an embodiment. In at least some embodiments, the OFDM data unit is the data unit 900 and the first communication protocol is the HE communication protocol. With reference to FIG. 1, the method 1400 is implemented by the network interface 16, in an embodiment. For example, in one such embodiment, the PHY processing unit 20 is configured to implement the method 1400. According to another embodiment, the MAC processing 18 is also configured to implement at least a part of the method 1400. With continued reference to FIG. 1, in yet another embodiment, the method 1400 is implemented by the network interface 27 (e.g., the PHY processing unit 29 and/or the MAC processing unit 28). In other embodiments, the method 1400 is implemented by other suitable network interfaces.

At block 1402, a first training field is generated to be included in a preamble of the OFDM data unit. The first training field i) conforms to a second communication protocol, and ii) has an integer number of OFDM symbols $L_N$ having a periodicity $L_P$. In an embodiment, the first training field is the L-STF 702, which conforms to the IEEE 802.11a standard and includes ten OFDM symbols having a periodicity of 0.8 microseconds.

At block 1404, a second training field is generated to be included in the preamble after the first training field. In an embodiment, the second training field i) conforms to the first communication protocol, ii) has an integer number of OFDM symbols $H_N$ having a periodicity $H_P$, and iii) is based on a frequency sequence having non-zero values at an interval K, where K is an integer. In an embodiment, the second training field is the HE-STF 910, which conforms to the HE communication protocol. In various embodiments, the frequency sequence is one of the frequency sequences 1000, 1025, 1100, 1125, 1150, 1200, or 1225. In some embodiments, the first training field is based on the frequency sequence having non-zero values at an interval K/2. In some embodiments, the interval K is equal to eight and the integer number $L_N$ is at least three. In other embodiments, the interval K is equal to four and the integer number $L_N$ is at least two. In still other embodiments, the interval K is equal to 16 and the integer number $L_N$ is at least five. In an embodiment, block 1404 includes duplicating the frequency sequence to obtain a lower portion of the second training field and duplicating the frequency sequence to obtain an upper portion of the second training field. In this embodiment, the lower portion has a negative frequency offset from a direct current tone and the upper portion has a positive frequency offset from the direct current tone.

At block 1406, the first training field is modulated using a first tone spacing $L_{TS}$ between adjacent OFDM tones. In an embodiment, the first tone spacing $L_{TS}$ is a legacy tone spacing of 312.5 KHz, corresponding to a 64-point DFT across a bandwidth of 20 MHz. In another embodiment, the first tone spacing is a legacy tone spacing of 312.5 KHz, corresponding to a 64-point DFT repeated across a plurality of 20 MHz sub-bands.

At block 1408, the second training field is modulated using a second tone spacing $H_{TS}$. The first tone spacing $L_{TS}$ is a multiple M of the second tone spacing $H_{TS}$. The second training field is generated such that the periodicity $H_P$ is i) proportional to the periodicity $L_P$ and the interval K, and ii) inversely proportional to the multiple M. In an embodiment, M is equal to four and the second tone spacing $H_{TS}$ is 78.125 KHz.

In some embodiments, the periodicity $H_P$ corresponds to a selected transmission mode from a plurality of transmission modes where each of the plurality of transmission modes corresponds to a different periodicity and the preamble is generated to indicate the selected transmission mode. For example, in an embodiment, the preamble is generated to include the periodicity indication (PI) 902. In some embodiments, the selected transmission mode is selected from the plurality of transmission modes based on a deployment usage of the communication channel. For example, in an embodiment, a first transmission mode corresponds to a periodicity of 0.8 microseconds and a second transmission mode corresponds to a periodicity of 1.6 microseconds or 3.2 microseconds. In this embodiment, the first transmission mode is selected when the deployment usage is characterized by shorter channel delay spreads (e.g., indoor communication channels) or higher SNR values and the second transmission mode is selected when the deployment usage is characterized by longer channel delay spreads (e.g., outdoor communication channels) or lower SNR values, using suitable thresholds for delay spreads and/or SNR values.

In an embodiment, each OFDM tone for the second training field is modulated using a steering matrix that corresponds to a same OFDM tone of a data portion of the OFDM data unit. In another embodiment, each OFDM tone for the second training field is modulated using a steering matrix that is interpolated from steering matrices of neighboring OFDM tones of a data portion of the OFDM data unit. In yet another embodiment, a plurality of consecutive OFDM tones for the second training field are modulated using a same transmit beamforming steering matrix.

At block 1410, the preamble is generated to include at least the first training field and the second training field. In an embodiment, the preamble also includes the L-LTF 704, the L-SIG 706, the HE-SIGA 708, the HE-LTFs 712, and the HE-SIGB 714, in the order shown in FIG. 9.

At block 1412, the OFDM data unit is generated to include at least the preamble. In some embodiments, the OFDM data unit includes the data portion 716. In other embodiments, the data portion 716 is omitted.

In some embodiments, the OFDM data unit is an uplink orthogonal frequency division multiple access (OFDMA) data unit that includes a data portion. In an embodiment, the second training field and the data portion of the uplink OFDMA data unit are caused to be transmitted to a communication device with a same normalized transmission power applied to OFDM tones that are assigned to the communication device. For example, in an embodiment, the access point 14 assigns a tone block to the client station 25 and the client station applies a transmission power boost to the second training field and the data portion 716. In some embodiments, the OFDM data unit is an uplink multi-user multiple input, multiple output (MU-MIMO) data unit having a data portion. In an embodiment, the second training field and the data portion are caused to be transmitted to a communication device with a same normalized transmission power applied to OFDM tones that are assigned to the communication device. In some embodiments, the OFDM data unit is a downlink multi-user multiple input, multiple output orthogonal frequency division multiple access (MU-MIMO-OFDMA) data unit that is transmitted to a communication device with a selective transmission power boost applied to OFDM tones of the second training field that are assigned to the communication device.

Figure 15:
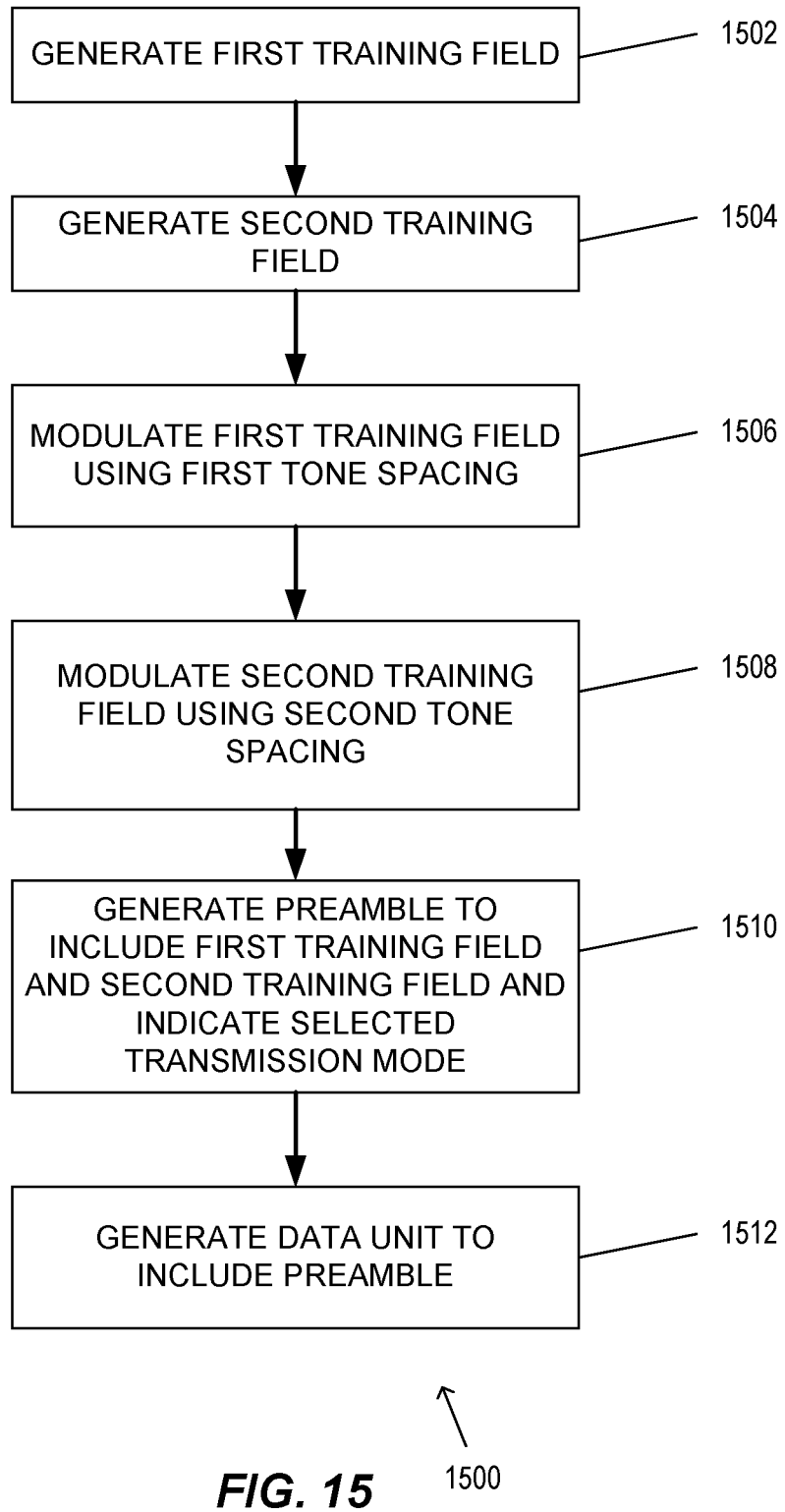
FIG. 15 is a flow diagram of another example method for generating a data unit that conforms to a first communication protocol for transmission via a communication channel, according to an embodiment.

FIG. 15 is a flow diagram of an example method 1500 for generating an OFDM data unit that conforms to a first communication protocol for transmission via a communication channel, according to an embodiment. In at least some embodiments, the OFDM data unit is the data unit 900 and the first communication protocol is the HE communication protocol. With reference to FIG. 1, the method 1500 is implemented by the network interface 16, in an embodiment. For example, in one such embodiment, the PHY processing unit 20 is configured to implement the method 1500. According to another embodiment, the MAC processing 18 is also configured to implement at least a part of the method 1500. With continued reference to FIG. 1, in yet another embodiment, the method 1500 is implemented by the network interface 27 (e.g., the PHY processing unit 29 and/or the MAC processing unit 28). In other embodiments, the method 1500 is implemented by other suitable network interfaces.

At block 1502, a first training field is generated to be included in a preamble of the OFDM data unit. The first training field i) conforms to a second communication protocol, and ii) has a first periodicity. In an embodiment, the first training field is the L-STF 702, which conforms to the IEEE 802.11a standard and has a periodicity of 0.8 microseconds.

At block 1504, a second training field is generated to be included in the preamble after the first training field. The second training field i) conforms to the first communication protocol, and ii) has a second periodicity that corresponds to a selected transmission mode of the communication channel. In an embodiment, the second training field is the HE-STF 910, which conforms to the HE communication protocol. In various embodiments, the selected transmission mode is selected from a plurality of transmission modes where each of the plurality of transmission modes corresponds to a different periodicity. In an embodiment, the selected transmission mode is selected based on a deployment usage of the communication channel. In an embodiment, the second periodicity is different from the first periodicity.

At block 1506, the first training field is modulated using a first tone spacing between adjacent OFDM tones. In an embodiment, the first tone spacing is a legacy tone spacing of 312.5 KHz, corresponding to a 64-point DFT across a bandwidth of 20 MHz. In another embodiment, the first tone spacing is a legacy tone spacing of 312.5 KHz, corresponding to a 64-point DFT repeated across a plurality of 20 MHz sub-bands.

At block 1508, the second training field is modulated using a second tone spacing, where the second tone spacing is narrower than the first tone spacing. In an embodiment, the second tone spacing is 78.125 KHz.

At block 1510, the preamble is generated i) to include at least the first training field and the second training field, and ii) to indicate the selected transmission mode. In an embodiment, block 1510 includes generating a first OFDM symbol for a non-legacy signal field of the OFDM data unit and modulating the first OFDM symbol followed by a duplicate of the first OFDM symbol to indicate the selected transmission mode. In an embodiment, the preamble is generated to include the periodicity indication (PI) 902.

At block 1512, the OFDM data unit is generated to include at least the preamble. In an embodiment, the OFDM data unit omits a data portion. In another embodiment, the OFDM dada unit includes a data portion.

Figure 16:
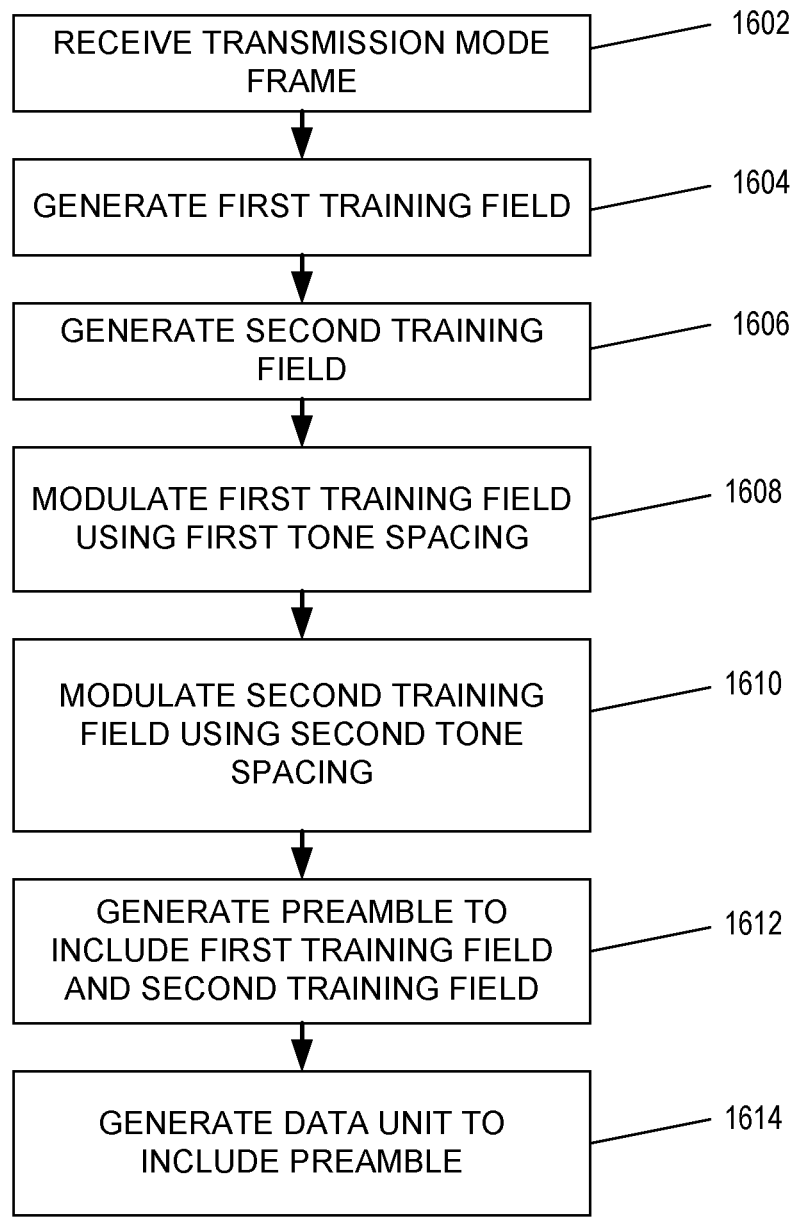
FIG. 16 is a flow diagram of an example method for generating an OFDM data unit that conforms to a first communication protocol for transmission via a communication channel, according to an embodiment.

FIG. 16 is a flow diagram of an example method 1600 for generating an OFDM data unit that conforms to a first communication protocol for transmission via a communication channel, according to an embodiment. In at least some embodiments, the OFDM data unit is the data unit 900 and the first communication protocol is the HE communication protocol. With reference to FIG. 1, the method 1600 is implemented by the network interface 16, in an embodiment. For example, in one such embodiment, the PHY processing unit 20 is configured to implement the method 1600. According to another embodiment, the MAC processing 18 is also configured to implement at least a part of the method 1600. With continued reference to FIG. 1, in yet another embodiment, the method 1600 is implemented by the network interface 27 (e.g., the PHY processing unit 29 and/or the MAC processing unit 28). In other embodiments, the method 1600 is implemented by other suitable network interfaces.

At block 1602, a transmission mode frame that identifies a transmission mode for the OFDM data unit from a plurality of transmission modes is received from an access point. In various embodiments, the identified transmission mode is selected by the access point from a plurality of transmission modes where each of the plurality of transmission modes corresponds to a different periodicity. In an embodiment, the identified transmission mode is selected by the access point based on a deployment usage of the communication channel. In an embodiment, the transmission mode frame is a trigger frame that i) triggers the generation of the OFDM data unit, and ii) explicitly identifies the transmission mode from the plurality of transmission modes.

At block 1604, a first training field is generated to be included in a preamble of the OFDM data unit. The first training field i) conforms to a second communication protocol, and ii) has a first periodicity. In an embodiment, the first training field is the L-STF 702, which conforms to the IEEE 802.11a standard and has a periodicity of 0.8 microseconds.

At block 1606, a second training field is generated to be included in the preamble after the first training field. The second training field i) conforms to the first communication protocol, and ii) has a second periodicity that corresponds to the identified transmission mode. In an embodiment, the second training field is the HE-STF 910, which conforms to the HE communication protocol. In an embodiment, the second periodicity is different from the first periodicity. In an embodiment, the identified transmission mode is selected based on content of the trigger frame that implicitly identifies the identified transmission mode. In an embodiment, the content of the trigger frame includes resource allocation information that identifies allocations of OFDMA resource units (RUs) for a plurality of client stations. In an embodiment, the identified transmission mode is selected from the plurality of transmission modes based on an allocation status of a predetermined OFDMA RU of the resource allocation information. In an embodiment, the transmission mode frame is a control frame or management frame that includes a periodicity indication corresponding to the identified transmission mode.

At block 1608, the first training field is modulated using a first tone spacing between adjacent OFDM tones. In an embodiment, the first tone spacing is a legacy tone spacing of 312.5 KHz, corresponding to a 64-point DFT across a bandwidth of 20 MHz. In another embodiment, the first tone spacing is a legacy tone spacing of 312.5 KHz, corresponding to a 64-point DFT repeated across a plurality of 20 MHz sub-bands.

At block 1610, the second training field is modulated using a second tone spacing, where the second tone spacing is narrower than the first tone spacing. In an embodiment, the second tone spacing is 78.125 KHz.

At block 1612, the preamble is generated to include at least the first training field and the second training field. In an embodiment, block 1612 includes generating a first OFDM symbol for a non-legacy signal field of the OFDM data unit and modulating the first OFDM symbol followed by a duplicate of the first OFDM symbol to indicate the selected transmission mode. In an embodiment, the preamble is generated to include the periodicity indication (PI) 902.

At block 1614, the OFDM data unit is generated to include at least the preamble. In an embodiment, the OFDM data unit omits a data portion. In another embodiment, the OFDM dada unit includes a data portion.

Figure 17:
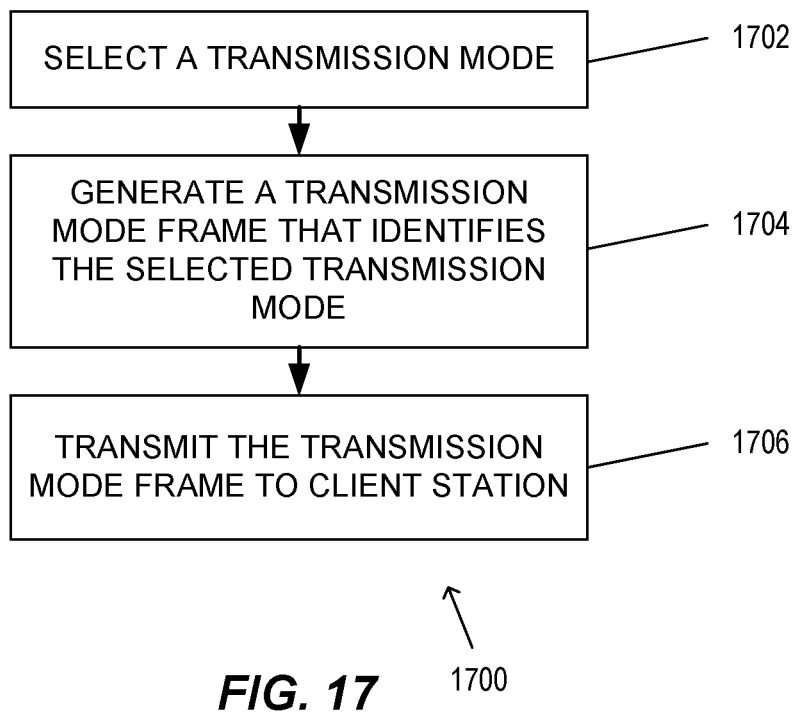
FIG. 17 is a flow diagram of an example method for causing a transmission of an OFDM data unit that conforms to a first communication protocol via a communication channel, according to an embodiment.

FIG. 17 is a flow diagram of an example method 1700 for causing a transmission of an OFDM data unit that conforms to a first communication protocol via a communication channel, according to an embodiment. In at least some embodiments, the OFDM data unit is the data unit 900 and the first communication protocol is the HE communication protocol. With reference to FIG. 1, the method 1500 is implemented by the network interface 16, in an embodiment. For example, in one such embodiment, the PHY processing unit 20 is configured to implement the method 1500. According to another embodiment, the MAC processing 18 is also configured to implement at least a part of the method 1500. With continued reference to FIG. 1, in yet another embodiment, the method 1500 is implemented by the network interface 27 (e.g., the PHY processing unit 29 and/or the MAC processing unit 28). In other embodiments, the method 1500 is implemented by other suitable network interfaces.

At block 1702, a transmission mode is selected for the OFDM data unit from a plurality of transmission modes. In an embodiment, each of the plurality of transmission modes corresponds to a different periodicity and the selected transmission mode corresponds to a selected periodicity.

At block 1704, a transmission mode frame that identifies the selected transmission mode is generated. In an embodiment, the transmission mode frame is a control frame or management frame that includes a periodicity indication corresponding to the selected transmission mode. In another embodiment, the transmission mode frame is a trigger frame that i) triggers the generation of the OFDM data unit, and ii) explicitly identifies the selected transmission mode. In an embodiment, content is generated for a data portion of the transmission mode frame that implicitly identifies the selected transmission mode so that the client station can determine the selected transmission mode based on the content. In an embodiment, the content of the transmission mode frame includes resource allocation information that identifies allocations of OFDMA resource units (RUs) for a plurality of client stations. For example, in an embodiment, OFDMA RUs are allocated for the plurality of client stations so that an allocation status of a predetermined OFDMA RU implicitly identifies the selected periodicity, and the resource allocation information is generated to correspond to the allocation status.

At block 1706, the transmission mode frame is transmitted to a client station so that the client station can determine the selected periodicity from the transmission mode frame for application to a non-legacy short training field of the OFDM data unit transmitted by the client station.

In an embodiment, the OFDM data unit is received via the communication channel. In an embodiment, a legacy training field is processed from a preamble of the OFDM data unit using a legacy tone spacing between adjacent OFDM tones. The legacy training field conforms to a legacy communication protocol (e.g., IEEE 802.11a, IEEE 802.11n, and/or IEEE 802.11ac), in an embodiment. In an embodiment, the non-legacy training field is processed from the preamble of the OFDM data unit using a non-legacy tone spacing. The non-legacy tone spacing is narrower than the legacy tone spacing and the non-legacy training field: i) conforms to the first communication protocol, and ii) has the selected periodicity that corresponds to the selected transmission mode, in an embodiment. A data portion of the OFDM data unit is demodulated based on the processed non-legacy training field, in an embodiment. For example, in an embodiment, the access point performs an automatic gain control (AGC) function and demodulates and/or decodes the data portion based on the AGC function.

Further aspects of the present invention relate to one or more of the following clauses.

In an embodiment, a method for generating an orthogonal frequency division multiplex (OFDM) data unit that conforms to a first communication protocol for transmission via a communication channel includes generating a first training field to be included in a preamble of the OFDM data unit. The first training field: i) conforms to a second communication protocol, and ii) has an integer number of OFDM symbols $L_N$ having a periodicity $L_P$. The method includes generating a second training field to be included in the preamble after the first training field, wherein the second training field: i) conforms to the first communication protocol, ii) has an integer number of OFDM symbols $H_N$ having a periodicity $H_P$, and iii) is based on a frequency sequence having non-zero values at an interval K, where K is an integer. The method includes modulating the first training field using a first tone spacing $L_{TS}$ between adjacent OFDM tones. The method includes modulating the second training field using a second tone spacing $H_{TS}$, where the first tone spacing $L_{TS}$ is a multiple M of the second tone spacing $H_{TS}$. The method includes generating the preamble to include at least the first training field and the second training field. The method includes generating the OFDM data unit to include at least the preamble. Generating the second training field includes generating the second training field such that the periodicity HP: is i) proportional to the periodicity LP and the interval K, and ii) inversely proportional to the multiple M.

In other embodiments, the method includes any suitable combination of one or more of the following features.

The interval K is equal to eight and the integer number $L_N$ is at least three.

The first training field is based on the frequency sequence having non-zero values at an interval K/2. Generating the second training field includes duplicating the frequency sequence to obtain a lower portion of the second training field, the lower portion have a negative frequency offset from a direct current tone, and duplicating the frequency sequence to obtain an upper portion of the second training field, the upper portion having a positive frequency offset from the direct current tone.

The interval K is equal to four and the integer number $L_N$ is at least two.

The interval K is equal to 16 and the integer number $L_N$ is at least five.

The periodicity $H_P$ corresponds to a selected transmission mode of a plurality of transmission modes, each of the plurality of transmission modes corresponding to a different periodicity; and generating the preamble includes generating the preamble to indicate the selected transmission mode.

The method further includes selecting the selected transmission mode from the plurality of transmission modes based on a deployment usage of the communication channel.

The OFDM data unit is a downlink multi-user multiple input, multiple output orthogonal frequency division multiple access (MU-MIMO-OFDMA) data unit, and the method further includes causing the downlink MU-MIMO-OFDMA data unit to be transmitted to a communication device with a selective transmission power boost applied to OFDM tones of the second training field that are assigned to the communication device.

The OFDM data unit is an uplink orthogonal frequency division multiple access (OFDMA) data unit, and the method further includes causing the second training field and a data portion of the uplink OFDMA data unit to be transmitted to a communication device with a same normalized transmission power applied to OFDM tones that are assigned to the communication device.

The OFDM data unit is an uplink multi-user multiple input, multiple output (MU-MIMO) data unit, and the method further includes causing the second training field and a data portion of the uplink MU-MIMO data unit to be transmitted to a communication device with a same normalized transmission power applied to OFDM tones that are assigned to the communication device.

Modulating the second training field includes modulating each OFDM tone for the second training field using a steering matrix that corresponds to a same OFDM tone of a data portion of the data unit.

Modulating the second training field includes modulating each OFDM tone for the second training field using a steering matrix that is interpolated from steering matrices of neighboring OFDM tones of a data portion of the data unit.

Modulating the second training field includes modulating a plurality of consecutive OFDM tones for the second training field using a same transmit beamforming steering matrix.

Generating the first training field includes generating a legacy short training field and generating the second training field includes generating a non-legacy short training field.

Generating the OFDM data unit includes omitting a data portion of the OFDM data unit.

In another embodiment, a communication device that generates an orthogonal frequency division multiplex (OFDM) data unit conforming to a first communication protocol for transmission via a communication channel includes a network interface device having one or more integrated circuits. The one or more integrated circuits are configured to generate a first training field to be included in a preamble of the OFDM data unit. The first training field: i) conforms to a second communication protocol, and ii) has an integer number of OFDM symbols $L_N$ having a periodicity $L_P$. The one or more integrated circuits are configured to generate a second training field to be included in the preamble after the first training field. The second training field: i) conforms to the first communication protocol, ii) has an integer number of OFDM symbols $H_N$ having a periodicity $H_P$, and iii) is based on a frequency sequence having non-zero values at an interval K, where K is an integer. The one or more integrated circuits are configured to modulate the first training field using a first tone spacing $L_{TS}$ between adjacent OFDM tones. The one or more integrated circuits are configured to modulate the second training field using a second tone spacing $H_{TS}$, where the first tone spacing $L_{TS}$ is a multiple M of the second tone spacing $H_{TS}$. The one or more integrated circuits are configured to generate the preamble to include at least the first training field and the second training field. The one or more integrated circuits are configured to generate the OFDM data unit to include at least the preamble. The one or more integrated circuits are configured to generate the periodicity $H_P$ to be: i) proportional to the periodicity $L_P$ and the interval K, and ii) inversely proportional to the multiple M.

In other embodiments, the communication device includes any suitable combination of one or more of the following features.

The interval K is equal to eight and the integer number $L_N$ is at least three.

The interval K is equal to four and the integer number $L_N$ is at least two.

The interval K is equal to 16 and the integer number $L_N$ is at least five.

The periodicity $H_P$ corresponds to a selected transmission mode of a plurality of transmission modes, each of the plurality of transmission modes corresponding to a different periodicity, and the one or more integrated circuits are configured to generate the preamble to indicate the selected transmission mode.

The OFDM data unit is an uplink orthogonal frequency division multiple access (OFDMA) data unit. The one or more integrated circuits are configured to cause the second training field and a data portion of the uplink OFDMA data unit to be transmitted to a communication device with a same normalized transmission power applied to OFDM tones that are assigned to the communication device.

The OFDM data unit is an uplink multi-user multiple input, multiple output (MU-MIMO) data unit, and the one or more integrated circuits are configured to cause the second training field and a data portion of the uplink MU-MIMO data unit to be transmitted to a communication device with a same normalized transmission power applied to OFDM tones that are assigned to the communication device.

The one or more integrated circuits are configured to modulate each OFDM tone for the second training field using a steering matrix that corresponds to a same OFDM tone of a data portion of the OFDM data unit.

The one or more integrated circuits are configured to modulate each OFDM tone for the second training field using a steering matrix that is interpolated from steering matrices of neighboring OFDM tones of a data portion of the OFDM data unit.

The one or more integrated circuits are configured to omit a data portion of the OFDM data unit.

In an embodiment, a method for generating an orthogonal frequency division multiplex (OFDM) data unit conforming to a first communication protocol for transmission via a communication channel includes: generating a first training field to be included in a preamble of the OFDM data unit, wherein the first training field: i) conforms to a second communication protocol, and ii) has a first periodicity; generating a second training field to be included in the preamble after the first training field, wherein the second training field: i) conforms to the first communication protocol, and ii) has a second periodicity that corresponds to a selected transmission mode of the communication channel; modulating the first training field using a first tone spacing between adjacent OFDM tones; modulating the second training field using a second tone spacing, where the second tone spacing is narrower than the first tone spacing; generating the preamble: i) to include at least the first training field and the second training field, and ii) to indicate the selected transmission mode; and generating the OFDM data unit to include at least the preamble.

In other embodiments, the method includes any suitable combination of one or more of the following features.

The method further includes selecting the selected transmission mode from a plurality of transmission modes, each of the plurality of transmission modes corresponding to a different periodicity.

Selecting the selected transmission mode includes selecting the transmission mode based on a deployment usage of the communication channel.

The second periodicity is different from the first periodicity.

Generating the preamble includes: generating a first OFDM symbol for a non-legacy signal field of the OFDM data unit; and modulating the first OFDM symbol followed by a duplicate of the first OFDM symbol to indicate the selected transmission mode.

Generating the OFDM data unit includes omitting a data portion of the OFDM data unit.

In an embodiment, a communication device that generates an orthogonal frequency division multiplex (OFDM) data unit conforming to a first communication protocol for transmission via a communication channel includes a network interface device having one or more integrated circuits. The one or more integrated circuits are configured to: generate a first training field to be included in a preamble of the OFDM data unit, wherein the first training field: i) conforms to a second communication protocol, and ii) has a first periodicity, generate a second training field to be included in the preamble after the first training field, wherein the second training field: i) conforms to the first communication protocol, and ii) has a second periodicity that corresponds to a selected transmission mode of the communication channel, modulate the first training field using a first tone spacing between adjacent OFDM tones, modulate the second training field using a second tone spacing, where the second tone spacing is narrower than the first tone spacing, generate the preamble: i) to include at least the first training field and the second training field, and ii) to indicate the selected transmission mode, and generate the OFDM data unit to include at least the preamble.

In other embodiments, the communication device includes any suitable combination of one or more of the following features.

The one or more integrated circuits are configured to select the selected transmission mode from a plurality of transmission modes, each of the plurality of transmission modes corresponding to a different periodicity.

The one or more integrated circuits are configured to select the transmission mode based on a deployment usage of the communication channel.

The second periodicity is different from the first periodicity.

The one or more integrated circuits are configured to: generate a first OFDM symbol for a non-legacy signal field of the OFDM data unit, and modulate the first OFDM symbol followed by a duplicate of the first OFDM symbol to indicate the selected transmission mode.

The one or more integrated circuits are configured to omit a data portion of the OFDM data unit.

In another embodiment, a method for generating an orthogonal frequency division multiplex (OFDM) data unit conforming to a first communication protocol for transmission via a communication channel includes: receiving, from an access point, a transmission mode frame that identifies a transmission mode for the OFDM data unit from a plurality of transmission modes; generating a first training field to be included in a preamble of the OFDM data unit, wherein the first training field: i) conforms to a second communication protocol, and ii) has a first periodicity; generating a second training field to be included in the preamble after the first training field, wherein the second training field: i) conforms to the first communication protocol, and ii) has a second periodicity that corresponds to the identified transmission mode; modulating the first training field using a first tone spacing between adjacent OFDM tones; modulating the second training field using a second tone spacing, where the second tone spacing is narrower than the first tone spacing; generating the preamble to include at least the first training field and the second training field; and generating the OFDM data unit to include at least the preamble.

In other embodiments, the method includes any suitable combination of one or more of the following features.

The transmission mode frame is a trigger frame that i) triggers the generation of the OFDM data unit, and ii) explicitly identifies the transmission mode from the plurality of transmission modes.

The transmission mode frame is a trigger frame that triggers the generation of the OFDM data unit, and generating the second training field to be included in the preamble includes selecting the identified transmission mode based on content of the trigger frame that implicitly identifies the identified transmission mode.

The content of the trigger frame includes resource allocation information that identifies allocations of OFDMA resource units (RUs) for a plurality of client stations, and determining the identified transmission mode based on content of the trigger frame includes selecting the identified transmission mode from the plurality of transmission modes based on an allocation status of a predetermined OFDMA RU of the resource allocation information.

The transmission mode frame is a control frame or management frame that includes a periodicity indication corresponding to the identified transmission mode.

In an embodiment, a method for causing a transmission of an orthogonal frequency division multiplex (OFDM) data unit conforming to a first communication protocol via a communication channel includes: selecting a transmission mode for the OFDM data unit from a plurality of transmission modes, wherein each of the plurality of transmission modes corresponds to a different periodicity and the selected transmission mode corresponds to a selected periodicity; generating a transmission mode frame that identifies the selected transmission mode; and transmitting the transmission mode frame to a client station so that the client station can determine the selected periodicity from the transmission mode frame for application to a non-legacy short training field of the OFDM data unit transmitted by the client station.

In other embodiments, the method includes any suitable combination of one or more of the following features.

The method further includes receiving the OFDM data unit via the communication channel, processing a legacy training field from a preamble of the OFDM data unit using a legacy tone spacing between adjacent OFDM tones, wherein the legacy training field conforms to a legacy communication protocol, processing the non-legacy training field from the preamble of the OFDM data unit using a non-legacy tone spacing, wherein the non-legacy tone spacing is narrower than the legacy tone spacing and the non-legacy training field: i) conforms to the first communication protocol, and ii) has the selected periodicity that corresponds to the selected transmission mode, and demodulating a data portion of the OFDM data unit based on the processed non-legacy training field.

Generating the transmission mode frame that identifies the selected transmission mode includes generating a trigger frame that i) triggers the generation of the OFDM data unit, and ii) explicitly identifies the selected transmission mode.

Generating the transmission mode frame that identifies the selected transmission mode includes generating content for a data portion of the transmission mode frame that implicitly identifies the selected transmission mode so that the client station can determine the selected transmission mode based on the content.

The content of the transmission mode frame includes resource allocation information that identifies allocations of OFDMA resource units (RUs) for a plurality of client stations. Generating the transmission mode frame includes:

allocating OFDMA RUs for the plurality of client stations so that an allocation status of a predetermined OFDMA RU implicitly identifies the selected periodicity, and generating the resource allocation information that corresponds to the allocation status.

Generating the transmission mode frame includes generating a control frame or management frame that includes a periodicity indication corresponding to the selected transmission mode.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable medium such as a magnetic disk, an optical disk, a random access memory (RAM), a read only memory (ROM), a flash memory, a memory of a processor, a magnetic tape, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for generating an orthogonal frequency division multiplex (OFDM) data unit for transmission via a communication channel, the OFDM data unit conforming to a first communication protocol, the method comprising:
   generating a first training field to be included in a preamble of the OFDM data unit, wherein the first training field: i) conforms to a second communication protocol, and ii) has a first periodicity;
   generating a second training field to be included in the preamble after the first training field, wherein the second training field: i) conforms to the first communication protocol, and ii) has a second periodicity that corresponds to a selected transmission mode of the communication channel;
   modulating the first training field using a first tone spacing between adjacent OFDM tones;
   modulating the second training field using a second tone spacing, where the second tone spacing is narrower than the first tone spacing;
   generating the preamble: i) to include at least the first training field and the second training field, and ii) to indicate the selected transmission mode;
   generating the OFDM data unit to include at least the preamble; and
   causing the OFDM data unit to be transmitted via the communication channel using the selected transmission mode.

2. The method of claim 1, further comprising selecting the selected transmission mode from a plurality of transmission modes, each of the plurality of transmission modes corresponding to a different periodicity.

3. The method of claim 2, wherein selecting the selected transmission mode comprises selecting the transmission mode based on a deployment usage of the communication channel.

4. The method of claim 2, wherein the second periodicity is different from the first periodicity.

5. The method of claim 1, wherein generating the preamble comprises:
   generating a first OFDM symbol for a non-legacy signal field of the OFDM data unit; and
   modulating the first OFDM symbol followed by a duplicate of the first OFDM symbol to indicate the selected transmission mode.

6. The method of claim 1, wherein generating the OFDM data unit comprises omitting a data portion of the OFDM data unit.

7. An apparatus, comprising:
   a network interface device having one or more integrated circuits configured to:
      generate a first training field to be included in a preamble of an orthogonal frequency division multiplex (OFDM) data unit for transmission via a communication channel according to a first communication protocol, wherein the first training field: i) conforms to a second communication protocol, and ii) has a first periodicity,
      generate a second training field to be included in the preamble after the first training field, wherein the second training field: i) conforms to the first communication protocol, and ii) has a second periodicity that corresponds to a selected transmission mode of the communication channel,
      modulate the first training field using a first tone spacing between adjacent OFDM tones,
      modulate the second training field using a second tone spacing, where the second tone spacing is narrower than the first tone spacing,
      generate the preamble: i) to include at least the first training field and the second training field, and ii) to indicate the selected transmission mode,
      generate the OFDM data unit to include at least the preamble, and
      cause the OFDM data unit to be transmitted via the communication channel using the selected transmission mode.

8. The apparatus of claim 7, wherein the one or more integrated circuits are configured to select the selected transmission mode from a plurality of transmission modes, each of the plurality of transmission modes corresponding to a different periodicity.

9. The apparatus of claim 8, wherein the one or more integrated circuits are configured to select the transmission mode based on a deployment usage of the communication channel.

10. The apparatus of claim 8, wherein the second periodicity is different from the first periodicity.

11. The apparatus of claim 7, wherein the one or more integrated circuits are configured to:
   generate a first OFDM symbol for a non-legacy signal field of the OFDM data unit, and
   modulate the first OFDM symbol followed by a duplicate of the first OFDM symbol to indicate the selected transmission mode.

12. The apparatus of claim 7, wherein the one or more integrated circuits are configured to omit a data portion of the OFDM data unit.

13. A method for generating an orthogonal frequency division multiplex (OFDM) data unit for transmission via a communication channel, the OFDM data unit conforming to a first communication protocol, the method comprising:
- receiving, from an access point, a transmission mode frame that identifies a transmission mode for the OFDM data unit from a plurality of transmission modes;
- generating a first training field to be included in a preamble of the OFDM data unit, wherein the first training field: i) conforms to a second communication protocol, and ii) has a first periodicity;
- generating a second training field to be included in the preamble after the first training field, wherein the second training field: i) conforms to the first communication protocol, and ii) has a second periodicity that corresponds to the identified transmission mode;
- modulating the first training field using a first tone spacing between adjacent OFDM tones;
- modulating the second training field using a second tone spacing, where the second tone spacing is narrower than the first tone spacing;
- generating the preamble to include at least the first training field and the second training field;
- generating the OFDM data unit to include at least the preamble; and
- transmitting the OFDM data unit via the communication channel using the identified transmission mode.

14. The method of claim 13, wherein the transmission mode frame is a trigger frame that i) triggers the generation of the OFDM data unit, and ii) explicitly identifies the transmission mode from the plurality of transmission modes.

15. The method of claim 13, wherein:
- the transmission mode frame is a trigger frame that triggers the generation of the OFDM data unit, and
- generating the second training field to be included in the preamble comprises selecting the identified transmission mode based on content of the trigger frame that implicitly identifies the identified transmission mode.

16. The method of claim 15, wherein:
- the content of the trigger frame comprises resource allocation information that identifies allocations of OFDMA resource units (RUs) for a plurality of client stations, and
- determining the identified transmission mode based on content of the trigger frame comprises selecting the identified transmission mode from the plurality of transmission modes based on an allocation status of a predetermined OFDMA RU of the resource allocation information.

17. The method of claim 13, wherein the transmission mode frame is a control frame or management frame that includes a periodicity indication corresponding to the identified transmission mode.

18. An apparatus, comprising:
- a network interface device having one or more integrated circuits configured to:
  - receive a transmission mode frame that identifies a transmission mode, from a plurality of transmission modes defined by a first communication protocol, for an orthogonal frequency division multiplex (OFDM) data unit,
  - generate a first training field to be included in a preamble of the OFDM data unit, wherein the first training field: i) conforms to a second communication protocol, and ii) has a first periodicity,
  - generate a second training field to be included in the preamble after the first training field, wherein the second training field: i) conforms to the first communication protocol, and ii) has a second periodicity that corresponds to the identified transmission mode,
  - modulate the first training field using a first tone spacing between adjacent OFDM tones,
  - modulate the second training field using a second tone spacing, where the second tone spacing is narrower than the first tone spacing,
  - generate the preamble to include at least the first training field and the second training field,
  - generate the OFDM data unit to include at least the preamble, and
  - transmit the OFDM data unit via the communication channel using the identified transmission mode.

19. The apparatus of claim 18, wherein:
the transmission mode frame is a trigger frame that explicitly identifies the transmission mode from the plurality of transmission modes; and
the one or more integrated circuits are configured to transmit the OFDM data unit responsive to the trigger frame.

20. The apparatus of claim 18, wherein:
the transmission mode frame is a trigger frame;
the one or more integrated circuits are configured to:
- transmit the OFDM data unit responsive to the trigger frame, and
- determine the identified transmission mode based on content of the trigger frame that implicitly identifies the identified transmission mode.

21. The apparatus of claim 20, wherein:
the content of the trigger frame comprises resource allocation information that identifies allocations of OFDMA resource units (RUs) for a plurality of client stations; and
the one or more integrated circuits are configured to determine the identified transmission mode from the plurality of transmission modes based on an allocation status of a predetermined OFDMA RU of the resource allocation information.

22. The apparatus of claim 18, wherein the transmission mode frame is a control frame or management frame that includes a periodicity indication corresponding to the identified transmission mode.

* * * * *